(12) United States Patent
Wanielista et al.

(10) Patent No.: US 8,002,984 B1
(45) Date of Patent: *Aug. 23, 2011

(54) GREEN SORPTION MATERIAL MIXES FOR WATER TREATMENT

(75) Inventors: Martin Wanielista, Winter Park, FL (US); Ni-Bin Chang, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,783

(22) Filed: Dec. 18, 2009

Related U.S. Application Data

(63) Continuation-in-part of application No. 12/200,140, filed on Aug. 28, 2008, now Pat. No. 7,897,047, which is a continuation of application No. 12/208,617, filed on Sep. 11, 2008, now Pat. No. 7,927,484.

(60) Provisional application No. 60/967,259, filed on Aug. 31, 2007.

(51) Int. Cl.
*C02F 3/32* (2006.01)
*C02F 1/28* (2006.01)

(52) U.S. Cl. .................. 210/602; 210/679; 210/691

(58) Field of Classification Search ............ 210/170.01, 210/170.08, 747, 532.1, 679, 691; 252/180
See application file for complete search history.

(56) References Cited

U.S. PATENT DOCUMENTS

| | | | |
|---|---|---|---|
| 5,014,462 A | 5/1991 | Malmgren et al. | |
| 5,509,203 A | 4/1996 | Yamashita | |
| 5,707,527 A * | 1/1998 | Knutson et al. | 210/660 |
| 5,733,453 A * | 3/1998 | DeBusk | 210/602 |
| 5,750,026 A * | 5/1998 | Gadkaree et al. | 210/502.1 |
| 5,823,711 A | 10/1998 | Herd et al. | |
| 5,958,239 A * | 9/1999 | Sing | 210/605 |
| 6,214,229 B1 | 4/2001 | Ronertson | |
| 6,458,179 B1 | 10/2002 | Puskarich | |
| 6,652,743 B2 * | 11/2003 | Wallace et al. | 210/170.01 |
| 6,969,469 B1 | 11/2005 | Xie | |
| 7,288,190 B2 * | 10/2007 | Presby | 210/170.08 |
| 2004/0112809 A1* | 6/2004 | Hassett | 210/150 |
| 2005/0161407 A1* | 7/2005 | McPhillips | 210/747 |
| 2006/0124540 A1* | 6/2006 | Austin et al. | 210/602 |

OTHER PUBLICATIONS

Birch, G.F., Fazeli, M.S., and Mathai, C., Efficiency of an infiltration Basin in Removing Contaminants from Urban Stormwater, Environmental Monitoring and Assessment, 2005 , pp. 22-38, vol. 101.

(Continued)

*Primary Examiner* — Fred Prince
(74) *Attorney, Agent, or Firm* — Brain S. Steinberger; Phyllis K. Wood; Law Offices of Brian S.Steinberger, P.A.

(57) ABSTRACT

Media compositions for use in wastewater treatment, stormwater treatment, CSO treatment and greenroof stormwater management systems as filtration media, plant growth media or pollutant retention media. Media composition includes at least one of a recycled material selected from a group consisting of tire crumb, wood sawdust and paper and a naturally occurring material selected from a group consisting of sand, limestone, sandy clay, expanded clay, organics used for processing geothermal water, organics used for agricultural drainage basins and filtration, and organics for aquaculture drainage and organics used for silviculture and forest drainage, and organics used as growing media.

33 Claims, 11 Drawing Sheets

OTHER PUBLICATIONS

Clark, S., Pitt, R., and Broan, D., Effect of Anaerobiosis on Filter Media Pollutant Retention, Presented at the Engineering Foundation and the American Society of Civil Engineers Conference on Information and Monitoring Needs for Evaluating the mitigation effects of BMP's, Snowmass, Co. 2001.

Debusk, T.A., Langston, M.A. Schwegler, B.R., and Davidson, S., An evaluation of Filter Media for Treating Storm water runoff, Proceeding of the fifth Biennial Storm Water Research conference1997, pp. 82-89.

Darbi, A., Viaraghavan, T., Butler, R., and Corkal, D., Batch Studies on Nitrate Removal from Portable water, Water South Africa, 2002, pp. 319-322, vol. 28, No. 3.

Florida Department of Health, Wekiva Basin Onside Sewage Treatment and Disposal System Study, Department of Osite Sewage Program, available at the internet at: http://www.doh.state.fl.us/enviorment////ostds/wekiva/ wekivastudyrtp.pdf, 2004.

Forbs, M. G., Dickson, K. L., Saleh, F., Doyle, R. D., Hudak, P., and Waller, W.T., Recovery and Fractionation of Phosphate Retained by Lightweight Expanded Shale and Masonry Sand used as Media in Subsurface Flow Treatment Wetlands, Environmental Science & Technology, 2005, pp. 4621-4627, vol. 39, No. 12.

Gungor, K., Unlu, K., Nitrate Removal Efficiencies of Soil Aquifer Treatment Columns, Turkish J. Eng. Env. Sci., 2005, pp. 159-170, vol. 29.

Hsieh, C. H., Davis, A. P., Engineered Bioretention for Removal of Nitrate from Storm Water Runoff, Diffuse Pollution Conference Dublin, Ireland, 2003.

Kim, H., Seagren, E. A., Davis, A. P., Engineered Bioretention for removal of Nitrate from Storm Water Runoff, in WEFTEC 2000 Conference Proceedings on CDROM Research Symposium, Nitrogen Removal, Session 19, Anaheim CA, Oct. 2000.

Korkusuz, E.A.,Beklioglu, M., Demirer, G. N., Use of Blast Furnace Granulated Slag as a substrate in Vertical Flow Reed Beds: Field Application, Bioresource Technology, 2007, pp. 2089-2101, vol. 98.

Lisi, R. D. Park, J. K., Siter, J. C., Mitigating Nutrient Leaching with a Sub-Surface Drainage Layer of Granulated Tires. Waste Management, 2004, pp. 831-839, vol. 24, No. 8.

Mothersill, C. L., Anderson, B. C., Watt, W.E., Marsalek, J., Biological Filtration of Stormwater: Firld Operations and Hardwood forest Ecosystems. Biogeochemistry, 1996, pp. 541-562, vol. 35. No. 3.

Peterjohn, W. T., Adams, M. B., Gilliam, F. S., Symptoms of Nitrogen Saturation in Two Central Appalachian Hardwood Forest Ecosystems. Biochemistry, 1996, pp. 507-522, vol. 35.

Sengupta, S., Ergas, S. J., Autotrophic Biological Denitrification with Elemental Sulfur or Hydrogen for Complete Removal of Nitrate-Nitrogen from a Septic System Wastewater, Report Submitted to the NOAA/UNH cooperative Institute for Costal and Estuarine Enviormental Technology (CICEET). 2008.

Savage, A. J., Tyrrel, S. F., Compost Liquir Bioremediation using waste materials as biofiltration media, Biosource Technology, 2005, pp. 557-564, vol. 96.

World Health Organization (WHO), Guidelines for Drinking-Water Quality, 1st Addendum to the 3rd ed., vol. 1: Recommendations, World Health Organization, Geneva, 2006.

* cited by examiner

GREEN SORPTION MATERIAL MIXES FOR WATER TREATMENT

This application is a continuation-in-part of U.S. application Ser. No. 12/200,140 filed on Aug. 28, 2008, now U.S. Pat. No. 7,897,047 which claims the benefit of priority to U.S. Provisional Application No. 60/967,259 filed on Aug. 31, 2007, and of U.S. application Ser. No. 12/208,617 filed on Sep. 11, 2008, now U.S. Pat. No. 7,927,484.

FIELD OF THE INVENTION

This invention relates to stormwater and wastewater treatment sorption media composition that includes recycled materials such as tire crumb and wood sawdust and naturally occurring materials such as sand, limestone, sandy clay, expanded clay, and organics that are combined to treat domestic wastewater and stormwater.

BACKGROUND AND PRIOR ART

Nitrate concentrations have increased in many Upper Floridian aquifer springs since the 1950s, exceeding 1 mg/L in recent years at some springs. The Upper Floridian aquifer is particularly vulnerable to impacts from anthropogenic activities in areas where the aquifer is not confined or only thinly confined, such as throughout much of Marion County, north-central Florida. Phelps (2004) reported that nitrate concentrations ranged from less than 0.02 to 12 mg/L, with a median of 1.2 mg/L, for 56 Upper Floridian aquifer wells sampled in Marion County during 2000-2001. Stormwater runoff is one of the possible sources of nitrate, among others suck as septic tanks, land-based application of reclaimed stormwater, or fertilizer, which can contribute to elevated nitrate concentrations in the Upper Floridian aquifer.

Wastewater and Sewage Treatment:

A problem arises when urban regions gradually expand due to regional development, centralized sewage collection, treatment, and disposal is often unavailable for both geographic and economic seasons. As a consequence, about a quarter of the residences in the United States relied on decentralized treatment of wastewater. As the stormwater runoff, household wastewater contains high concentrations of nutrients, primarily nitrogen and phosphorus, disease-causing organisms and viruses, and some toxic chemicals. Nationwide, wastewater effluent from on-site wastewater treatment (OWTS) can represent a large fraction of nutrient loads to groundwater aquifers: Phosphorus and nitrogen compounds are the most frequent measurements to indicate nutrient loadings. Some aquifers may discharge into springs or other surface waters adversely affecting public health. Hence, on-site wastewater effluent disposal has contributed significant adverse impacts to the dynamics of the natural environment.

Due to widespread septic tank failure, scientists, engineers, and manufacturers in the wastewater treatment industry have developed a wide range of alternative passive technologies designed to address increasing hydraulic loads, energy saving requirement, and water contamination by nutrients and pathogens in on-site wastewater treatment.

Onsite sewage contains organic matter (biochemical oxygen demand), suspended solids, nutrients, and some pathogens, which can cause a number of diseases through ingestion or physical contact. Those water-related diseases include shigellosis, salmonellosis, typhoid fever, and infectious hepatitis. More than 25 million homes, or 25 percent of the U.S. population, use onsite wastewater treatment systems to meet their wastewater treatment and disposal needs. The most common type of onsite wastewater treatment plant ("mini treatment plant") is the septic system. When properly constructed and maintained, the septic systems can provide years of safe, reliable, cost-effective service.

A septic system consists of four main components. The first component is a home's indoor plumbing, which is a system of drains and pipes located inside a home in charge of transporting wastewater outside to the next major component, the septic tank. The septic tank is normally an underground, watertight container, made of concrete, fiberglass, or other durable material, which provides primary wastewater treatment. In the septic tank, solids settle to the bottom of the tank and partially decompose by naturally occurring bacteria resulting in a layer of soaps, greases and scum float on top of the liquid wastewater. There is a need to periodically remove the floating scum and submerged solids accumulated in the tank. The liquid wastewater between the floating and settled solids has to be discharged from the septic tank to the next major component of a septic system, the drainfield.

The standard drainfield that is constructed by a series of parallel, underground, perforated pipes allows the septic tank effluent to percolate into the surrounding soil in the vadose (unsaturated) zone where most of the residual nutrients may be assimilated. Through various physical, chemical, and biological processes, most bacteria, viruses and nutrients in wastewater are expected to be consumed as the wastewater passes through the soil. The type of effluent distribution in the standard drainfield systems include gravity systems, low pressure dosed systems, drip irrigation systems, etc. and some of them require having an additional pump.

Nutrients such as ammonia, nitrite, nitrate, and phosphorus are common contaminants in the water bodies all over the world, as well the emerging contaminants that affect aquatic ecosystems. All these nutrients have direct and indirect acute and chronic harmful outcome for human beings and ecosystems. Ammonia is an important compound in freshwater ecosystems. It can stimulate phytoplankton growth, exhibit toxicity to aquatic biota, and exert an oxygen demand in surface waters. Hence, primarily due to the limited nitrogen-removal treatment capabilities of conventional septic systems, their density of use in a watershed can produce adverse and undesired aquatic resource impact through accelerated eutrophication. Besides, unionized ammonia is very toxic for salmonid and non-salmonid fish species. Fish mortality, health and reproduction can be hampered by the presence of minute amount of ammonia-N.

Nitrate is more toxic than nitrite and can cause human health problems such as liver damage and even cancers. Nitrate can also bind with hemoglobin and create a situation of oxygen deficiency in an infant's body called methemoglobinemia. Nitrite, however, can react with amines chemically or enzymatically to form nitrosamines that are very strong carcinogens.

In addition, wastewater also carries different kinds of microorganisms such as bacteria like *Escherichia coli* and *Salmonella typhi*, protozoa like *Cryptosporidium parvum* and *Giardia lamblia*, helminthes and viruses like hepatitis A virus. Concentration of total coliform is about 107-109 no./100 mL, fecal coliform is about 104-106 no./100 mL, *Cryptosporidium parvum* oocysts is about 10-1-101 no./100 mL and *Giardia lamblia* cysts is about 10-1-102 no./100 mL in a medium strength wastewater. Oocysts and cysts are spore phase that will help certain microorganisms to survive for a long time. These entire microorganisms are responsible for different kinds of diseases like diarrhea, jaundice, food poisoning, dysentery and nausea. If these diseases are not controlled properly, they may cause harmful effect on health even death due to domestic sewerage pollution.

As a consequence, nutrient and pathogen removal is very important for the sustainability of the aquatic ecosystem and environment. There are many ways for homeowners with septic systems to minimize the potential nutrient impacts that on-site wastewater treatment (OWTS) may have on the environment. Yet early codes did not consider the complex inter-relationships among nutrient impacts, soil conditions, wastewater characteristics, biological mechanisms and climate, or geoclimatic differences that might be big in vastly different regions.

At present, there is a need for promoting enhanced nitrogen removal in septic systems, as well as a better understanding of nitrogen removal behavior of the septic system effluent plume as it passes through soil to a receiving water body. In general, passive technologies might be advantageous due to their cost effectiveness, system reliability, and low maintenance requirement. This triggers an acute need to perform a thorough technology comparison, screening, and prioritization.

To reduce organic and nitrogen impacts, an aerobic treatment unit (ATU) may be used to treat wastewater prior to ground discharge, typically by adding aeration to promote decomposition of organic matter, reduce pathogens, and transform nutrients. Basic aerobic treatment unit designs include suspended growth systems, fixed-film systems, and integrated fixed film and suspended growth systems. All three types usually have a septic tank ahead of them that removes the large solids and provides some protection to the aerobic treatment unit. Yet passive treatment and disposal systems, which do not use aerator pumps and include no more than one effluent dosing pump, are relatively new (Chang et al., 2007). Passive on-site wastewater treatment is defined by the Florida Department of Health as a type of onsite sewage treatment and disposal system that excludes the use of aerator pumps and includes no more than one effluent dosing pump with mechanical and moving parts and uses a reactive media to assist in nitrogen removal. Reactive media are materials that effluent from a septic tank or pretreatment device passes through prior to reaching the groundwater. This may include but are not limited to soil, saw dust, zeolites, tire crumbs, vegetative removal, sulfur, spodosols, or other media. Hence, a new generation of performance-based, passive (as opposed to conventional) on-site wastewater treatment to effectively remove septic tank effluent nutrients and protect public health and the environment in a cost-effective manner will need to be devised and implemented with innovation.

For example, some technologies use a reactive media to assist in nitrogen removal. Saw dust and other wood products, zeolites, tire crumbs, vegetation, sulfur, spodosols, etc. have been suggested or used as such possible treatment media. These systems with new materials and methods will require increased focus on system performance, pollutant transport and fate, resulting environmental impacts, and an integration of the planning, design, sitting, installation, maintenance, and management functions. Cost effectiveness, system reliability, and proper management become the major concerns in applications. Treatment of Stormwater, Urban Runoff and Other Liquid Streams:

Another water management problem arises from stormwater runoff which is one of the possible sources of nitrate land-based application of reclaimed stormwater, or fertilizer, which can contribute to elevated nitrate concentrations in the Upper Floridian aquifer. Stormwater runoff is a known pollutant source capable of causing surface water degradation, especially in highly populated areas such as Central Florida. Wet detention ponds manage this stormwater, but most of the ponds do not remove enough nutrients, specifically nitrogen and phosphorus, to meet total maximum daily load regulations.

Most of the environmental management in the past few decades has focused largely on point-source pollution of industrial and municipal effluents. Not much comparable effort has been made to restrict the input of nitrogen and phosphorous from dispersed or nonpoint sources such as agricultural and urban runoff. As a result, anthropogenic inputs of nonpoint pollutants, particularly nitrogen and phosphorous, have increased dramatically. Elevated nutrient levels in surface and ground water may cause human health problems, such as blue baby syndrome, and may impair or destroy environmentally sensitive habitat through algal blooms and eutrophication.

Nitrogen-containing and phosphorous-containing compounds are found in urban stormwater runoff, primarily from highways. Nitrates normally result from vehicular exhaust on the roadway itself and are also contributed from fertilized landscaped areas and residential areas alongside the road. Considered one of the most efficient best management practices, a wet detention pond removes contaminants through physical, biological, and chemical processes. This practice is used to treat stormwater runoff before it enters a surface water body. According to Chapters 62-40 of the Florida Administration Code, a stormwater pond shall achieve an 80% average annual load reduction of pollutants from the influent stormwater. The current law refers to the removal of solids only. However, the pond can only remove a certain percentage of a contaminant, and the discharged pollution, although significantly less than in stormwater runoff, may still damage fragile ecosystems in the receiving water body. The data compiled by Harper and Baker (2007a) from previous research studies suggest that detention ponds do not achieve this 80% goal for the nutrient pollutants of concern. The averages of the removal efficiencies from these studies show a 37% removal of total nitrogen, 79% for orthophosphorus (OP), and 69% for total phosphorous. There is an acute need to provide innovative methods, systems, apparatus, and devices for nutrient control and management for sources of nitrogen and phosphorus including stormwater runoff.

The use of sorption media, such as compost, to capture pollutants from stormwater runoff started in the late 1990s. Stormwater infiltration systems were then widely used to address the quality issue of stormwater runoff through the use of either infiltration or exfiltration. Engineered soil mix that provides stormwater treatment through filtration has been deemed as a sustainable source-control option, and various types of applications have been promoted recently in the context of green infrastructure systems. Prior art discussed the simultaneous removal of nitrogen and solids in continuous upflow filters and a computer simulation of the nitrification process based on the Activated Sludge Model No. 1 developed by the International Association of Water Quality.

Many surface waters in Central Florida, such as Lake Jesup where nitrogen and phosphorus are considered the limiting nutrients for primary production, currently experience eutrophication problems caused by high nutrient loading from stormwater detention ponds (i.e., wet ponds). Stormwater runoff is just one possible source of nitrogen; others include septic tanks and land-based applications of reclaimed wastewater or fertilizer, which can elevate nutrient concentrations. In a total maximum daily load (TMDL) report for water quality improvement proposed by the Florida Department of Environmental Protection, the St. Johns River Water Management District examined several approaches to find a target nutrient concentration for Lake Jesup, which ranged from 0.04 to 0.08 mg/L for total phosphorus and 0.61 to 2.40 mg/L for total nitrogen. The St. Johns River Water Management District found concentrations of total nitrogen and total phosphorus that provide sufficient water clarity for growth of submerged aquatic vegetation over 25% of Lake Jesup.

Submerged aquatic vegetation growth should enhance fisheries and provide wildlife habitat, as well as reduce the resuspension of flocculent organic sediments. The total maximum daily load report for Lake Jesup also shows a current annual load entering the lake of 559,500 kg/year of total nitrogen and 36,000 kg/year of total phosphorus. Surface runoff accounts for 42% and 48% of the total nitrogen and total phosphorus loadings into the lake, respectively. To meet the total maximum daily load standards, the loading into the lake should decrease 52% for total nitrogen and 37% for total phosphorus. The total nitrogen and total phosphorus target concentrations that allow the 25% submerged aquatic vegetation criteria are 0.61 and 0.04 mg/L, respectively. These concentrations were used as the standards for Lake Jesup with regard to this research project. No point sources currently discharge into the lake, so these goals must result from reduced nutrient concentrations in stormwater runoff.

In addition to the applications of sorption media for wastewater treatment, our studies also evaluate the performance of a chamber upflow filter and skimmer in terms of water quality, water quantity, and overall operation and maintenance in association with stormwater wet ponds and runoff from pervious surfaces. Specifically, the objectives of this study include: (1) estimate the head loss through an upflow filter with a chosen media mix; (2) test the applicability of a surface skimmer; and (3) assess nitrogen and phosphorus concentrations leaving a detention pond using a chamber upflow filter and skimmer setup with a specific sorption media for pollution control.

Before 1995, much work was devoted to research for the removal of nutrients primarily with the sand filter method. For this reason, different types of sand filter methods had been developed like: 1) the Washington D.C. sand filter method, 2) the Delaware sand filter design and 3) the Austin sand filter. The removal efficiency of the Delaware sand filter is Total Suspended Solids (TSS) 70.20%, total phosphorus 71.10%, ammonia nitrogen (NH3-N) 67.00% and Total Kjeldahl nitrogen (TKN) 59.90%.

The use of upflow filtration for stormwater treatment is a relatively new idea to remove pollutants from contaminated stormwater runoff. Upflow filters have the advantage of longer run times and less maintenance than traditional downflow filters due to the design of the filter. Prior art used an upflow filter to treat runoff from highly contaminated critical source areas before it mixed with runoff from less contaminated areas. They studied a field application of the upflow filter inserted into a catch basin that achieved reductions of 70% for suspended solids, 65% for turbidity, and 18% for phosphorus. There are upflow filters commercialized for runoff treatment in stormwater inlets, and the successful integration of an upflow filter filled with the green sorption medium connected with a surface skimmer could provide a new best management practice to improve the quality of stormwater runoff.

Green sorption medium consists of several recycled and natural media that provide a favorable environment for pollutant removal to occur. Each type of medium assists in the removal of specific nutrients. Phosphorus sorbs to one type of medium, while another medium is utilized as a carbon source for nitrate removal under anoxic conditions. Anoxic environment has no free oxygen but does contain nitrate as electron acceptor for denitrification.

The combination of these elements provides a cost-effective treatment option to reduce nutrients traveling from wet detention ponds to surface waters. The present invention presents the use of a chamber upflow filter and skimmer (CUFS) filled with a specific green sorption medium as process modification of stormwater retention ponds, which can increase the removal of nitrogen and phosphorus in the stormwater runoff. A similar study had already proved the effectiveness of sorption medium for phosphorus removal from irrigation water in green roof chambers.

As a Statewide unified rule for stormwater management is being developed in Florida, there is a need to combine field and laboratory data for designing effective passive in-situ treatment units within stormwater retention/detention ponds for ultimate control of nitrogen impact on groundwater in Florida. The study leading to the present invention examined the ability of different sorption media to sorb nitrogen and phosphorus from stormwater contaminated with various fertilizers. Sorption media of interest include but are not limited to tire crumb, sawdust, activated carbon, iron amended resins, orange peel, peat, leaf compost, naturally occurring sands, zeolites, coconut husks, polymers, and soybean hulls. The study consisted of running both batch and packed bed column tests to determine the sorption capacity, the required sorption equilibration tire and the flow-through utilization efficiency of various sorption media under various contact times when exposed to stormwater contaminated with various nitrogen fertilizers.

Recent development shows that removal of ammonia, nitrite, nitrate, and phosphorus can be enhanced by mixing different sorption media, such as sawdust, tire crumb, sand, clay, zeolite, sulfur, and/or limestone, etc., with natural soil.

Appropriate media mix in this research is deemed as a kind of multifunctional material or functionalized sorption media that may be used in both natural and built environments to improve the existing physicochemical and microbiological processes for nutrient removal. Such media mix has the "green" implications because of the inclusion of some recycled materials, such as tire crumb and sawdust, as part of the recipe to promote the treatment efficiency and effectiveness. From engineering standpoint, with the aid of such green sorption media, nutrients in the water bodies can be reduced or even mostly removed by enhanced absorption/adsorption, nitrification/denitrification and other chemical reactions, such as precipitation and ion exchange.

The adsorption, absorption, ion exchange, and precipitation reactions are actually intertwined with physicochemical and microbiological processes in porous media intermittently. Pollutants removed by the adsorption process in the "green sorption media" may subsequently desorb. Two important biochemical transformation processes are the nitrification and denitrification that occur at the same time as the adsorption, absorption, ion exchange, and precipitation reactions move on. They result in the transformation of ammonia, nitrite, and nitrate via oxidation and reduction reactions in the microbiological process. In short, nitrification is a microbiologically mediated process that occurs under aerobic conditions, resulting in the formation of nitrate whereas denitrification is a microbiologically mediated process but occurs under anoxic or anaerobic conditions, resulting in the formation of gaseous forms of nitrogen. In reduction-oxidation chemistry, however, nitrification is a process in which ammonium is oxidized via nitrifiers and denitrification is a process in which nitrate is reduced to nitrogen gas via denitrifiers.

However, nitrifiers can grow best in a temperature range of 350° C. to 420° C. and denitrifiers can work well in a range of 100° C. to 250° C.

The integrated impact of temperature changes on both physicochemical and microbiological processes remains unknown when removing nutrient in these sorption media mixes. Research resulting in the present invention was aimed at exploring how the filtration kinetics of selected filter media for nutrient removal is affected by various temperatures leading to improve the application potential of green sorption media in all weather conditions. It starts with a through literature review followed by the material characterization of a selected sorption media, and a laboratory column study that was conducted to simulate a wastewater/stormwater treatment unit with saturated media conditions. Such a filtration kinetics study led to a comparison to investigate the capabilities of comparing a natural soil with soil augmentations in regard to remove nitrogen and phosphorus associated with a range of initial nutrient concentrations at three different temperatures (i.e., 28° C., 23° C., and 10° C.).

On one hand, research and testing was aimed at an innovative design of the underground drainfield with soil amendments (sorption media) in a pilot septic tank system. The present invention includes the design of the underground drainfield with soil amendments (sorption media) in a pilot septic tank system. In the initial test runs, the new system located at the on-site wastewater treatment test center at UCF has been tested and proved cost-effective. The new system located at the on-site wastewater treatment test center, University of Central Florida, Orlando, Fla. was tested and proved cost effective in the initial test run.

High nitrogen and phosphorus concentrations in stormwater runoff, contaminated groundwater, landfill leachate, and domestic and industrial wastewater effluents have negatively impacted the drinking water quality in many regions. The use of filter media, such as tire crumb, sawdust, sand, clay, zeolite, sulfur, limestone, etc., to get better removal efficiencies of nutrients has been the focus in the planning and design of green infrastructure. These material mixes mainly promote the adsorption/absorption and precipitation of orthophosphate in physicochemical process and the transformation of ammonia, nitrite, and nitrate via oxidation and reduction reactions in the microbiological process. However, temperature changes affect nutrient removal efficiencies in both natural and engineered systems.

On the other hand, research and testing resulting in the present invention aimed to explore the filtration kinetics of selected filter media for nutrient removal at various temperatures to improve their application potential in all weather conditions. Constituents of concern include ammonia, nitrite, nitrate, total nitrogen, and orthophosphate. Such a kinetics study leads to investigate the capabilities of comparing a natural soil with soil augmentations in regard to removing nutrients under a range of initial concentrations at three different temperatures (i.e., 28° C., 23° C., and 10° C.). Significant differences of removal efficiencies associated with these prespecified temperatures were statistically confirmed by ANOVA analyses.

Greenroof Stormwater Treatment:

The most practical approach to the problem of stormwater runoff is to treat the stormwater as close to where it was contaminated as possible. The practice of using plant- and soil-based techniques for treating and holding stormwater at the source to decrease stormwater runoff and increase evapotranspiration rates is called low-impact development. A complete water budget on a non-irrigated green roof found that for small precipitation events, the green roof was able to retain approximately 75% of the precipitation and reduce the peak flow by as much as 90% as well as increase the time of concentration to almost four hours. The time of concentration is the amount of time it takes for stormwater runoff to occur after a precipitation event has begun.

Most of the environmental management in the past few decades has focused largely on point-source pollution of industrial and municipal effluents. Not much comparable effort has been made to restrict the input of nitrogen and phosphorous from dispersed or nonpoint sources such as agricultural and urban runoff. As a result, anthropogenic inputs of nonpoint pollutants, particularly nitrogen and phosphorous, have increased dramatically. Elevated nutrient levels in surface and ground water may cause human health problems, such as blue baby syndrome, and may impair or destroy environmentally sensitive habitat through algal blooms and eutrophication.

SUMMARY OF THE INVENTION

A primary objective of the invention is to provide methods, systems and apparatus for use of alternative media for treatment and filtering of wastewater and stormwater.

A secondary objective of the present invention is to provide drain field media for the treatment and filtering of wastewater and stormwater, namely, media for filtration and biological treatment of wastewater and stormwater.

A third objective of the present invention is to provide sorption media compositions for nitrogen control, alkalinity control and phosphorus control for wastewater and stormwater treatment.

A fourth objective of the present invention is to provide media compositions including rubber tire crumb combined with sand and wood saw dust for nitrogen control for on-site-wastewater treatment; and sand combined with limestone for alkalinity control in on-site wastewater treatment.

A fifth objective of the invention is to provide stormwater media for the treatment of runoff, rapid infiltrated groundwater and other liquid streams.

A sixth objective of the present invention is to provide drainfield media for removing nitrogen and phosphorus found in septic tank effluent that are harmful to the environment using materials, compositions, and substances with different adequate recipes of green sorption media.

A seventh objective of the present invention is to provide a septic media composition for pollution control in subsurface upflow wetlands and for promoting plant growth in a subsurface upflow wetland. The composition for pollution control in subsurface upflow wetlands including sand, saw dust, tire crumb and limestone and the composition for promoting plant growth in a subsurface upflow wetland including expanded clay and peat.

An eighth objective of the invention is to provide stormwater media, namely rubber tire crumb combined with sandy clay and wood saw dust for nitrogen control in stormwater, urban runoff and other liquid streams.

A ninth objective of the invention is to provide stormwater media, namely rubber tire crumb combined with expanded clay and wood saw dust for phosphorus control in stormwater, urban runoff and other liquid streams.

A tenth objective of the invention is to provide stormwater media, namely rubber tire crumb combined with sand and wood saw dust for use with pervious pavements and bio filtration reservoirs.

An eleventh objective of the invention is to provide stormwater media, namely expanded clay and limestone for filtration and alkalinity control in stormwater, urban runoff and other liquid streams.

A twelfth objective of the invention is to provide stormwater media, namely expanded clay, and organics used for processing geothermal waters.

A thirteenth objective of the invention is to provide stormwater media, namely sandy clays and organics used for agricultural drainage basins and filtration.

A fourteenth objective of the invention is to provide stormwater media, namely expanded clay, sands, and organics used for aquaculture activities (fish and vegetation) drainage.

A fifteenth objective of the invention is to provide greenroof media for the growth of vegetation and retention of pollutants.

A sixteenth objective of the invention is to provide greenroof media, namely expanded clay, and organics used as a growing media;

A seventeenth objective of the invention is to provide greenroof media, namely rubber tire crumb combined with expanded clay and wood saw dust as an under growth media to retain pollutants for pollution control.

An eighteenth objective of the invention is to provide media for stormwater treatment and management having lower cost and higher benefit cost ratio and a lower maintenance burden.

A nineteenth objective of the invention is to provide stormwater media for stormwater treatment and management for sources of nitrogen and phosphorus in stormwater runoff from agricultural land uses, including runoff and enrichment of groundwater, aquaculture operation, including shrimp farm, fish farm, etc; forest clearance and geothermal inflows.

A twentieth objective of the invention is to provide stormwater media for stormwater treatment and management for filtration in stormwater vaulted systems and for nutrient control in stormwater upflow chambers. The media composition for filtration in stormwater vaulted systems include sand, sawdust and tire crumb and the media composition for nutrient control in stormwater upflow chambers including expanded clay, sandy clay and tire crumb.

A twenty-first objective of the invention is to provide media composition for pollution control in CSO upflow treatment units and for plant growth in CSO upflow treatment units. The media composition for pollution control in CSO upflow treatment units includes sand, saw dust, tire crumb and limestone and the media composition for plant growth in CSO upflow treatment units includes expanded clay and peat.

A sorption media composition can include at least two of a recycled material and a naturally occurring material, the recycled material selected from a group consisting of tire crumb, wood sawdust and compost, and the naturally occurring material selected from a group consisting of sand, limestone, sandy clay, expanded clay, peat, organics used for processing geothermal water, organics used for agricultural drainage basins and filtration, and organics used for aquaculture drainage and organics used for silviculture and forest drainage, and organics used as growing media.

The recycled material can consist of wood saw dust and tire crumb and the naturally occurring material is selected from a group including sand, saw dust, expanded clay, peat and limestone for wastewater treatment.

The media composition by volume can consist of approximately 66% to approximately 72% sand, approximately 6% to approximately 8% saw dust, and approximately 20% to approximately 28% tire crumb as a septic composition for nitrogen control in an on-site wastewater treatment. The media composition by volume can consist of approximately 77% to approximately 82% sand and approximately 18% to approximately 23% limestone as a septic composition for alkalinity control in on site wastewater treatment.

The media composition can consist of sand, saw dust, tire crumb and limestone as a septic composition for subsurface upflow wetland. The media composition by volume can consist of approximately 46 to approximately 54% sand, approximately 12 to approximately 18% saw dust, approximately 12 to approximately 18% tire crumb, and approximately 18 to approximately 22% limestone as a septic composition for pollution control in subsurface upflow wetlands.

The media composition can consist of expanded clay and peat as a septic composition for promoting plant growth in a subsurface upflow wetland. The media composition by volume can consist of approximately 75% to approximately 80% expanded clay, and approximately 20 to approximately 25% peat as a septic composition for promoting plant growth in a subsurface upflow wetland.

The recycled material is selected from a group can consist of wood saw dust, compost and tire crumb and the naturally occurring material is selected from a group consisting of sand, sandy clay, expanded clay, peat and limestone for stormwater treatment. The media composition by volume can consist of approximately 68% to approximately 72% sandy clay, approximately 6% to approximately 8% saw dust, and approximately 20% to approximately 26% tire crumb for nitrogen control in stormwater management systems.

The media composition by volume can consist of approximately 72% to approximately 78% expanded clay, approximately 8% to approximately 12% saw dust, and approximately 10% to approximately 18% tire crumb for phosphorus control in stormwater management systems.

The media composition by volume can consist of approximately 74% to approximately 78% sand, approximately 6% to approximately 10% saw dust, approximately 12% to approximately 20% tire crumb for use with pervious pavements and bio filtration reservoirs in a stormwater management system.

The media composition by volume can consist of approximately 40% to approximately 60% expanded clay and approximately 40% to approximately 60% limestone for filtration and alkalinity control in a stormwater management system.

The media composition by volume can consist of approximately 70% to approximately 80% expanded clay combined with approximately 20% to approximately 30% compost as a greenroof growth media in a greenroof system.

The media composition by volume can consist of approximately 62% to approximately 66% expanded clay, approximately 8% to approximately 10% saw dust and approximately 24% to approximately 30% tire crumb to retain pollutants in a greenroof water management system.

The media composition to retain pollutants in a greenroof water management system can be used under a greenroof growth media to retain pollutants in a greenroof water management system.

The media composition by volume can consist of approximately 72% to approximately 782% sand, approximately 8% to approximately 12% saw dust, and approximately 10% to approximately 18% tire crumb for filtration in stormwater vaulted systems for stormwater management.

The media composition by volume can consist of approximately 55% to approximately 65% expanded clay, approximately 18% to approximately 22% sandy clay and approximately 10 to approximately 30% tire crumb for nutrient control in a stormwater upflow chamber for stormwater management.

The media composition by volume can consist of approximately 65 to approximately 72% sandy clay, approximately 6 to approximately 10% organics, and approximately 20 to approximately 25% tire crumb as a geothermal composition to process geothermal water discharges in a stormwater management system.

The media composition by volume can consist of approximately 65 to approximately 75% expanded clay, approximately 5 to approximately 15% organics and approximately 10 to approximately 20% tire crumb as an agricultural composition for agricultural drainage basins and filtration in a stormwater management system.

The media composition by volume can consist of approximately 60 to approximately 70% expanded clay, approximately 5 to approximately 20% organics and approximately 10 to approximately 20% tire crumb as an aquaculture composition for aquaculture activities and drainage in a stormwater management system.

The media composition by volume can consist of approximately 60 to approximately 70% sandy clay, approximately 6 to approximately 10% organics, and approximately 20 to approximately 30% tire crumb for as a silviculture composition for silviculture and forest drainage management in a stormwater management system.

The media composition can consist of at least two of sand, expanded clay, peat, saw dust, tire crumb and limestone as a stormwater composition for pollution control in CSO upflow treatment units. The media composition by volume can consist of approximately 46 to approximately 54% sand, approximately 12 to approximately 18% saw dust, approximately 12 to approximately 18% tire crumb, 18 to approximately 22% limestone as a stormwater composition for pollution control in CSO upflow treatment units. The media composition by volume can consist of approximately 75 to approximately 80% expanded clay and approximately 20 to approximately 25% peat for plant growth in CSO upflow treatment units.

Further objects and advantages of this invention will be apparent from the following detailed description of preferred embodiments which are illustrated schematically in the accompanying drawings.

BRIEF DESCRIPTION OF THE FIGURES

FIG. 2b is a chart showing the removal efficiencies of another experimental septic tank and media composition showing an improved overall performance in comparison to the results shown in FIG. 2a.

DESCRIPTION OF THE PREFERRED EMBODIMENTS

Figure 1:
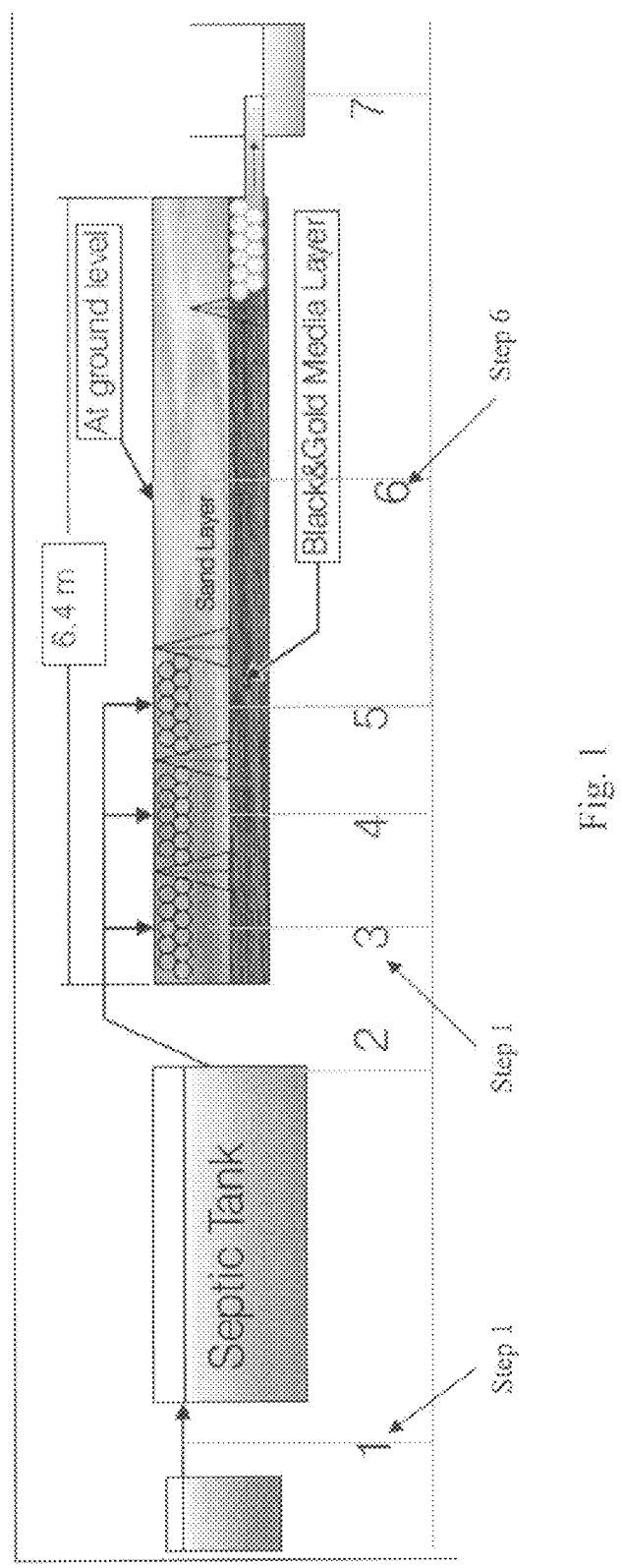
FIG. 1 is a schematic diagram of a wastewater treatment drainfield.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Engineered, functionalized, and natural sorption media can be used to treat stormwater runoff, wastewater effluents, groundwater flows, landfill leachates and sources of drinking water for nutrient removal via physicochemical and microbiological processes. They include but are not limited to sawdust, peat, compost, zeolite, wheat straw, newspaper, sand, limestone, expanded clay, wood chips, wood fibers, mulch, glass, ash, pumice, bentonite, tire crumbs, expanded shale, oyster shell, and soy meal hull. This approach has "green" implications because of the inclusion of recycled material as part of the material mixture promoting treatment efficiency and cost-effectiveness.

The choice of material mixes depend on the desired length of service, residence time during an operating cycle, and pollutants in the wastewater. The present invention expands on the testing of media compositions for filtering of wastewater and sewage and stormwater treatment including urban runoff, liquid streams, combined sewer overflow water treatment media and greenroof media.

Wastewater and Sewage Treatment:

Sewage treatment, or domestic wastewater treatment, is the process of removing contaminants from wastewater and household sewage, both runoff (effluents) and domestic. It includes physical, chemical, and biological processes to remove physical, chemical and biological contaminants. Its objective is to produce a waste stream (or treated effluent) and a solid waste or sludge suitable for discharge or reuse back into the environment. This material is often inadvertently contaminated with many toxic organic and inorganic compounds.

The projected uses of the media are for soil amendments for on-site wastewater systems filled with the sorption media in a manner that foster an anaerobic or anoxic environment saturated.

U.S. patent application Ser. Nos. 12/200,140 and 12/208,617 filed on Aug. 28, 2008 and Sep. 11, 2008 respectively, having a common inventor and assigned to the same assignee as this application and which incorporated by reference, describes methods, system, compositions for a green sorption media for bioretention soil amendments in drainfields for on-site waste water systems filled with the green sorption media to foster an anaerobic or anoxic environment saturated. The green sorption media includes one or more recycled materials, including tire crumb, sawdust, orange peel, coconut husks, leaf compost, oyster shell, soy bean hulls and one or more naturally occurring materials including peat, sands, zeolites, and clay. The wastewater filtration system for a passive drainfield includes the green sorption material mixture, a cell including baffled compartments and a riser, the cell filled with green sorption material mixture to provide an alternating cycle of aerobic and anoxic environments, an influent distribution system to distribute the influent over the cell, and a piping system arranged for dosing the cell to sustain the functionality of the green sorption material mixture to remove nutrient content in wastewater.

The green sorption media of the present invention provides the basic functionality of the drainfield filled with a unique recipe of green sorption media to remove both nutrients and pathogens, also referred to as Bold & Gold Septic™ media composition. It leads to developing an innovative passive underground drainfield that is highly sustainable to fit in any landscape and building environment on one hand, and highly applicable in dealing with any type of septic tank systems. FIG. 1 shows the schematic of the wastewater treatment drainfield using an experimental media composition.

The adsorption, absorption, ion exchange, and precipitation processes are actually intertwined with the overall physicochemical process. Some nutrients, such as phosphorus, removed by inorganic media are likely a sorption/precipitation complex. The distinction between adsorption and precipitation is the nature of the chemical bond forming between the pollutant and sorption media. Yet the attraction of sorption surface between the pollutant and the sorption media causes the pollutants to leave the aqueous solution and simply adhere to the sorption media. In the context of using various green sorption media for nutrient removal, it might appear that sorption is followed by precipitation or occurs at the same time in the same physicochemical process. Within the microbiological process, if there are organic sources in the wastewater streams, hydrolysis converts particulate organic nitrogen (N) to soluble organic N, and ammonification in turn releases ammonia into the water bodies.

In addition to ammonification, important biochemical transformation processes include nitrification and denitrification. They result in the transformation of nitrogen between ammonia, nitrite, and nitrate forms via oxidation and reduction reactions in microbiological processes. In the presence of ammonia-oxidizing bacteria (AOB) and oxygen in the aerobic environment, ammonium is converted to nitrite ($NO_2^-$) and nitrite-oxidizing bacteria (NOB) convert nitrite to nitrate ($NO_3^-$) continuously. Collectively these two reactions are called nitrification. Conversely, denitrification is an anaerobic respiration process using nitrate as a final electron acceptor with the presence of appropriate electron donors, resulting in the stepwise reduction of $NO_3^-$ to $NO_2^-$, nitric oxide (NO), nitrous oxide ($N_2O$), and nitrogen gas ($N_2$). Denitrification also requires the presence of an electron donor, which may commonly include organic carbon, iron, manganese, or sulfur, to make the reduction happen. As long as the hydraulic retention time (HRT) is long enough, microbe-mineral or sorption media interface can be initiated for either or both nitrification and denitrification process. In the present invention, sawdust is used as electron donors. The two steps of ammonia oxidation can be summarized as below in equations 1 and 2, $$2NH_4^+ + 3O_2 \rightarrow 2NO_2^- + 4H^+ + 2H_2O \quad (1)$$

$$2NO_2^- + O_2 \rightarrow 2NO_3^- \quad (2)$$

And the denitrification of wastewater is shown in equation 3

$$C_{10}H_{19}O_3N + 10NO_3^- \rightarrow 5N_2 + 10CO_2 + 3H_2O + NH_3 + 10OH^- \quad (3)$$

Seven process steps and sampling points within the drainfield system BOLD & GOLD SEPTIC™ media composition can be identified by FIG. 1. Steps 3, 4, and 5 have two media layers; the sand and the experimental media composition layers. experimental media composition layer thickness is approximately 30.48 cm (12 inches) contains approximately 68% sand, approximately 7% sawdust, and approximately 25% tire crumb by volume for this example. The sand layer is astatula sand with thickness of approximately 60.96 cm (24 inches) from the ground surface. The perforated inflow pipe is installed for equal distribution of influent. The test drainfield containing the media composition was monitored continuously for eight weeks.

Three sampling campaigns were completed during early October, early November, and mid November. Samples were analyzed by the Environmental Research and Design (ERD), a certified laboratory in Orlando, Fla., for the water quality analysis. Only two datasets addressing the water quality conditions on Oct. 14th and Nov. 5th are discussed in this patent application. The initial concentration of the sewerage is shown in Table 1 below.

TABLE 1(a)

Initial concentrations of basic parameters

| Unit | ALK mg/l | Turb NTU | TSS mg/l | VSS mg/l | $BOD_5$ mg/l | $CBOD_5$ mg/l |
|---|---|---|---|---|---|---|
| Influent (S1) | 293.0 | 123.0 | 175.0 | 154.0 | 31.3 | 31.2 |

TABLE 1(b)

Initial concentrations of nitrogen parameters (unit: μg/l)

| | $NH_3$ | $NO_x$—N* | Nitrite | Particulate N | Dissolved Organic N | Total N |
|---|---|---|---|---|---|---|
| Influent (S1) | 32,864.0 | 11.0 | 8.0 | 3,760.0 | 9,635.0 | 46,270.0 |

*$NO_x$—N=$NO_2^-$—N + $NO_3^-$—N

Figure 2A:
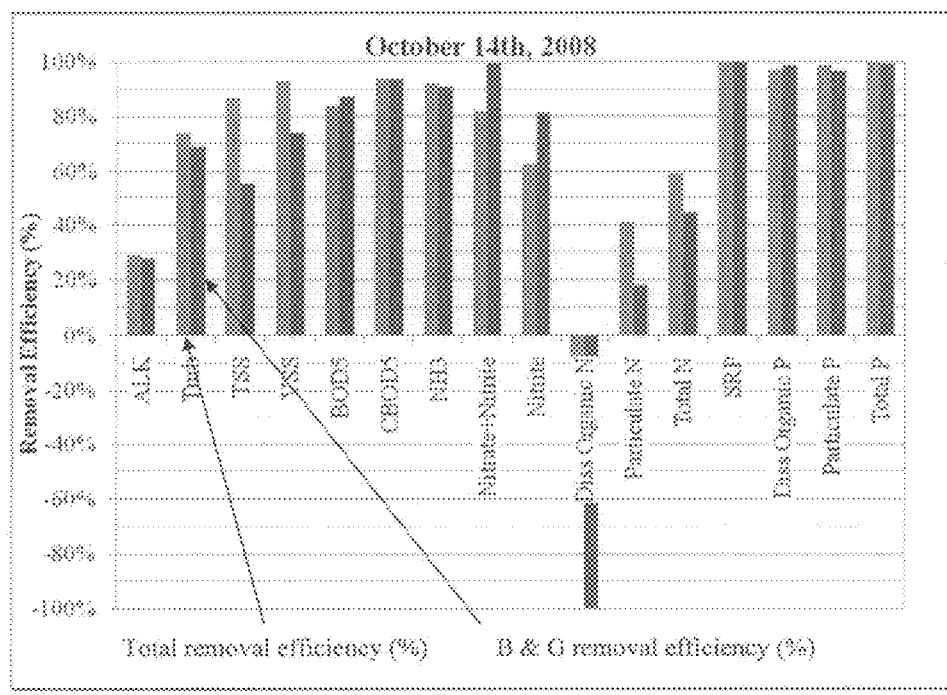
FIG. 2a is a chart showing the removal efficiencies of an experimental septic tank and media composition.

The chart shown in FIG. 2a shows the water quality analysis of the October 14$^{th}$ samples, respectively. FIG. 2a is a chart showing the removal efficiencies of an experimental septic tank and media composition. To examine the comparative advantage, the bars on the left show the total removal efficiencies of the combination of septic tank and the experimental media composition drainfield whereas the bars on the right show the removal efficiencies of the media composition in the drainfield only. If a left bar is higher than a right bar, removals occurred in both the septic tank and the drainfield media composition. If a right bar is higher than the left bar, an increase occurred in the septic tank and a removal occurred in the drainfield containing experimental media composition. For example, by comparing the nitrite removal efficiencies of the total (left bar) and the drainfield containing experimental media composition (right bar), the overall removal (left bar) is less (shorter) than the right bar, and thus the nitrite concentration increases in the septic tank, and nitrite is removed in the drainfield containing experimental media composition.

Figure 2B:
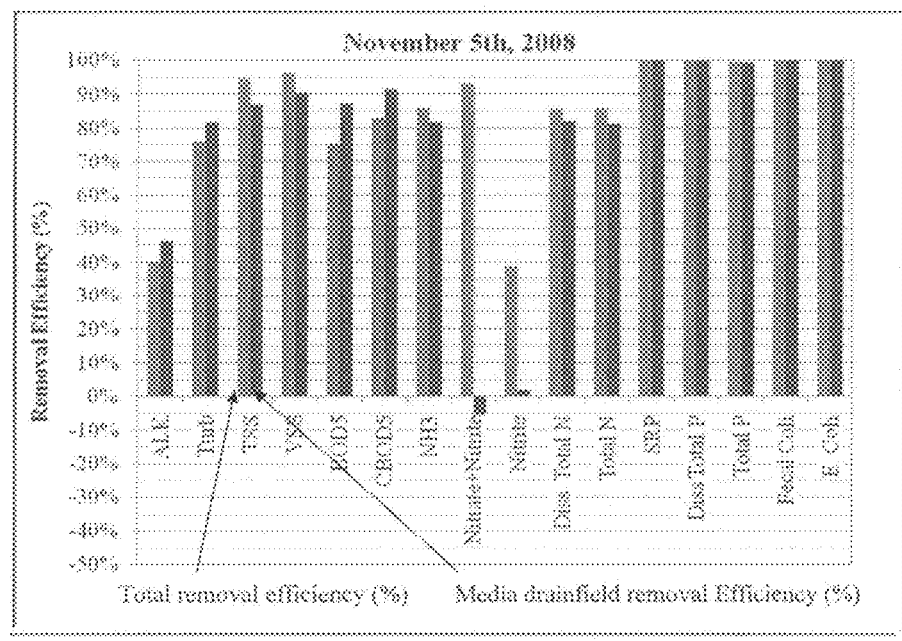

FIG. 2b is a chart showing the removal efficiencies of another experimental septic tank and media composition showing an improved overall performance in comparison to the results shown in FIG. 2a. The second dataset collected on November 5th showed that the performance of the drainfield media composition had improved over time as shown in FIG.

2b. Total Nitrogen removal efficiency increased from 58% (October 14th) to 85% (November 5th). Total phosphorus removal stayed above 98%. Fecal Coli and *E. Coli* removal efficiencies are above 99.9% (below 1 cfu in the effluent samples). The second dataset shown in FIG. 2b also confirmed that a smooth nitrification-denitrification process occurred in the experimental media composition drainfield system. Most of the ammonia conversion occurred in the sand layer of the experimental drainfield, and the nitrate and nitrite conversions occurred in the experimental media composition layer of the Bold & Gold drainfield where denitrification plays an important role.

Figure 3A:
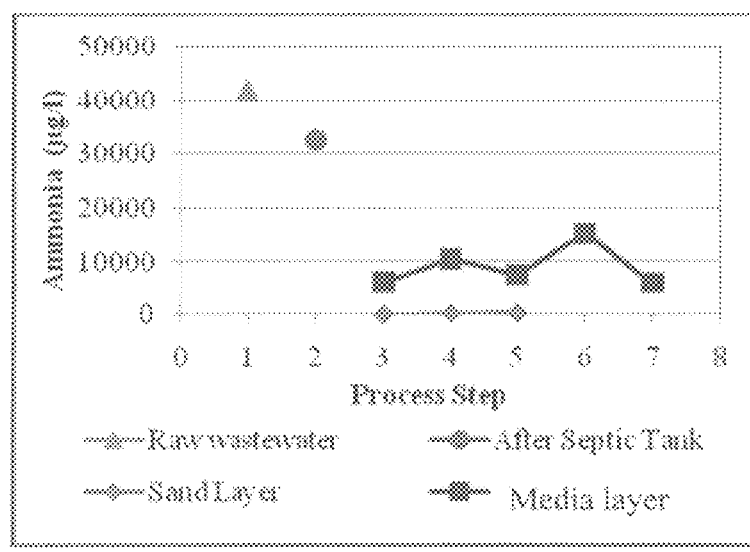
FIG. 3a shows the concentrations of ammonia in the experimental drainfield system.
Figure 3B:
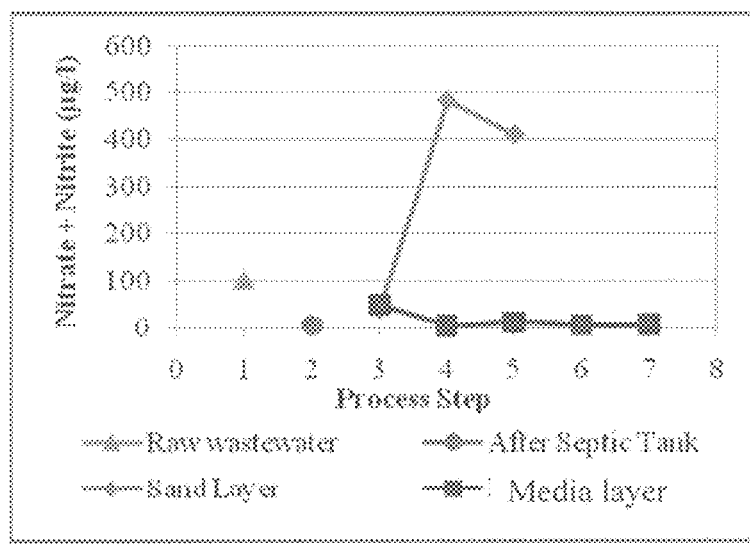
FIG. 3b shows the concentrations of nitrate in the experimental drainfield system.
Figure 3C:
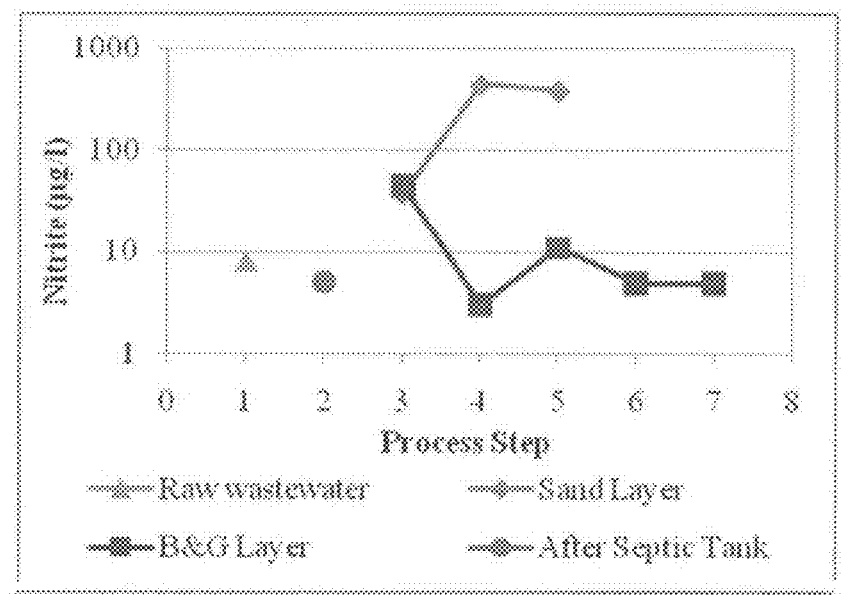
FIG. 3c shows the concentrations of nitrite in the experimental drainfield system.
Figure 3D:
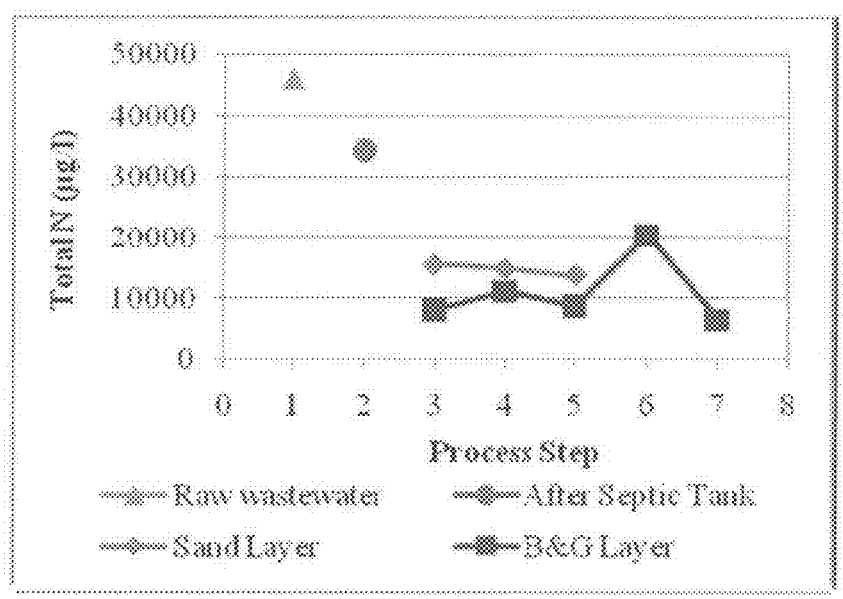
FIG. 3d shows the concentrations of total nitrogen in the experimental drainfield system.

FIGS. 3a through 3d, also show that most ammonia (FIG. 3a) was removed in the process steps 3, 4, and 5 (FIG. 1) at the sand layer (shallow layer), while the nitrate (FIG. 3b) and nitrite (FIG. 3c) were added in the experimental media composition layer (bottom layer) of the same process steps. FIG. 3d shows the concentrations of total nitrogen in the experimental drain system. FIGS. 3a through 3d also revealed the conversion from ammonia to nitrate and nitrite in the experimental drainfield was successful.

Figure 4:
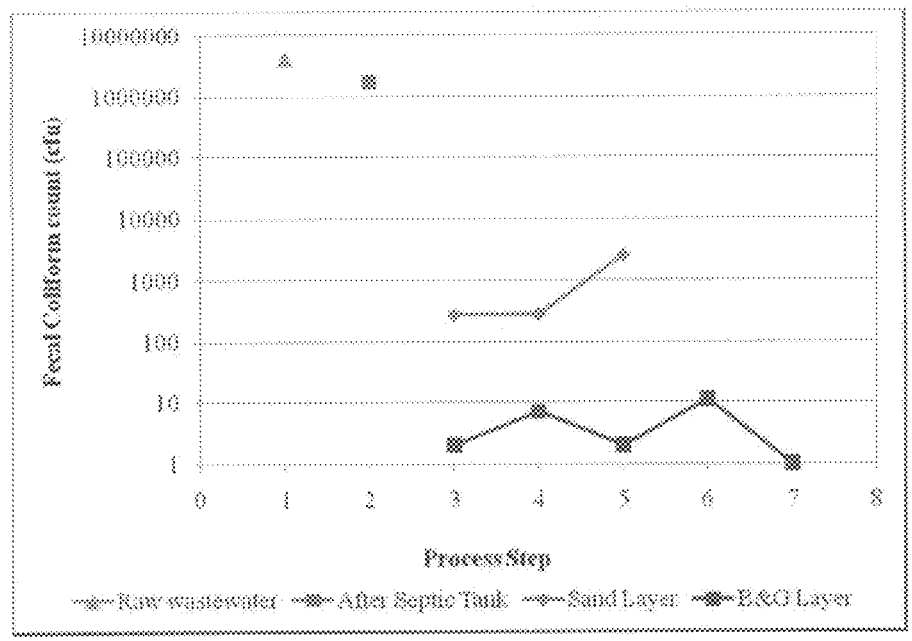
FIG. 4 is a chart showing fecal coliform counts after the wastewater has passed through the media composition in the experimental drainfield system.
Figure 5:
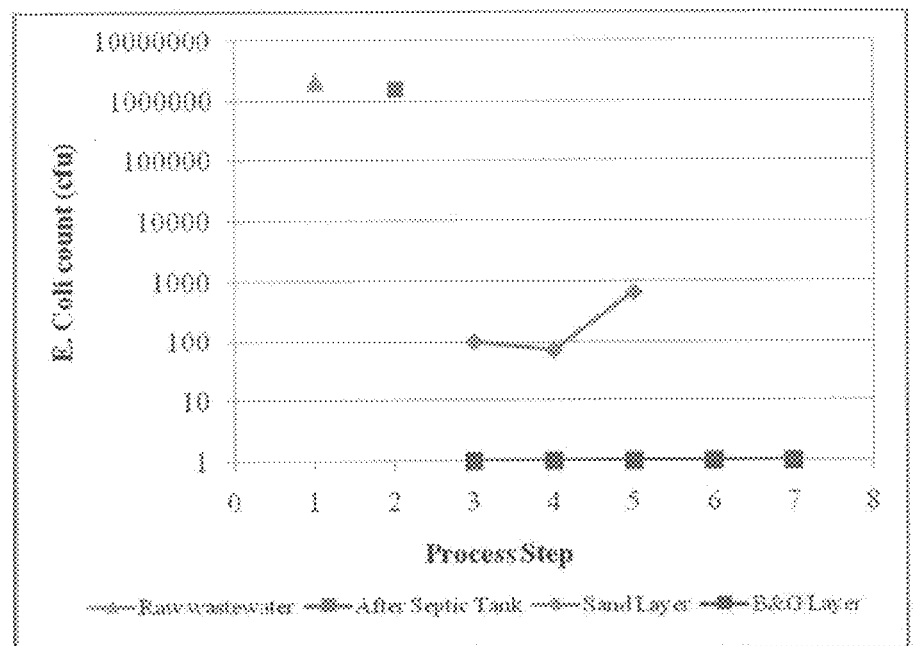
FIG. 5 is a chart showing the E. Coli counts in the experimental drainfield system containing the media composition.

FIG. 4 is a chart showing fecal coliform counts after the wastewater has passed through the media composition in the experimental drainfield system. The average count at the effluent was less than 1 cfu for the two datasets. FIG. 5 is a chart showing the *E. Coli* counts in the experimental drainfield system containing the media composition. FIGS. 4 and 5 show that the media composition in the experimental drainfield not only removes the nutrient but also filters the pathogens especially in the layer of media composition of the experimental drainfield.

The present invention provides Bold & Gold Septic™ media compositions for the wastewater drainfield system, demonstrating a new generation performance-based cost-effective passive on-site wastewater treatment system technology with sustainability implications. The sampling campaign supported the observations that a new passive on-site wastewater treatment system can remove both nutrient and *E-coli* several more orders of magnitude stringent than required by the current maximum contaminant level regulations. Overall, more than 85% and 96% of Total Nitrogen and Phosphorus were removed, respectively. The removal efficiency of $CBOD_5$ and Ammonia was also above 90 percent.

Such advancement, however, would be ultimately justified by environmental economics, including direct and indirect costs and benefits, which have been viewed as important information for decision making. Besides, the estimation of direct and indirect costs should also be associated with various risk-reduction strategies and methods of risk assessment for decision making. For the design of sustainable neighborhoods, more advanced and adaptive materials, biomaterials, and enabling or multifunctional engineering materials with co-treatment capacities are needed to remove more pollutants, such as heavy metal, pesticides etc., simultaneously. With risk management options at the individual home or community level that are practical, acceptable, and cost effective, the passive on-site wastewater treatment system and source separation alternatives may be further integrated based on their comparative advantages.

In summary, drainfield media for the treatment and filtering of wastewater and sewage, namely, media for filtration and biological treatment of wastewater includes recycled material such as wood saw dust and tire crumb and the naturally occurring materials such as sand and limestone for wastewater treatment. In a preferred embodiment of wastewater treatment, the media included rubber tire crumb combined with sand and wood saw dust for nitrogen control for on-site-wastewater treatment and the sand combined with limestone for alkalinity control in on-site wastewater treatment.

In a most preferred embodiment, the BOLD & GOLD SEPTIC™ wastewater treatment media composition by volume includes approximately 66% to approximately 72% sand, approximately 6% to approximately 8% saw dust, and approximately 20% to approximately 28% tire crumb for nitrogen control in an on-site wastewater treatment. The media composition by volume included approximately 77% to approximately 82% sand and approximately 18 to approximately 23% limestone for alkalinity control in on site wastewater treatment.

In another preferred embodiment of wastewater treatment, the BOLD & GOLD SEPTIC™ media composition includes sand, saw dust, tire crumb and limestone as a septic composition for subsurface upflow wetland. More specifically, the BOLD & GOLD SEPTIC™ media composition by volume includes approximately 46 to approximately 54% sand, approximately 12 to approximately 18% saw dust, approximately 12 to approximately 18% tire crumb, and approximately 18 to approximately 22% limestone as a septic composition for pollution control in the subsurface upflow wetlands.

In another preferred embodiment of wastewater treatment, the BOLD & GOLD SEPTIC™ media composition includes expanded clay and peat as a septic composition for promoting plant growth in a subsurface upflow wetland. More specifically, the media composition by volume includes approximately 75% to approximately 80% expanded clay and approximately 20 to approximately 25% peat as a septic composition for promoting plant growth in the subsurface upflow wetland.

Treatment of Stormwater, Urban Runoff and other Liquid Steams:

A laboratory column test method is a physical model, or microcosm, which attempts to simulate, on a small scale, a portion of the real world subsurface environment under a controlled set of experimental conditions. The ability to define and control stresses and boundary conditions makes soil column experiments well suited for identification and quantification of cause-and-effect relations in environmental processes, whereas investigation of such processes in the field often is limited to identification of statistical correlations due to the confounding nature of heterogeneity and unpredictability of temporal stresses. Columns were operated to approximate ponded infiltration beneath a stormwater infiltration basin. Such a condition is common in Florida during and following a storm where the water table is perennially below the basin bottom.

Under controlled laboratory conditions, different soils and amendments are tested to ascertain the effectiveness of each for reducing nitrate leaching. The nitrogen cycle is the transport and transformation of different nitrogen species is evaluated for each soil and soil/amendment mixture. The primary nitrogen species in the subsurface environment are organic nitrogen, ammonia, ammonium, nitrate, nitrite, and gaseous forms that include nitric oxide, nitrous oxide, and elemental nitrogen. Nitrogen species transformation is dependent on the number and types of nitrogen-degrading bacteria. These bacteria are affected by the presence of metals in concentrations high enough to inhibit biological activity. Thus, metal concentrations also must be documented within the soil water beneath dry infiltration basins.

Nonlinear sorption isotherms have significant environmental implications because concentration-dependent mobility of nitrogen compounds related to physical, chemical, and biological mechanisms complicate predictions of capacity in soil-media-water systems. To understand the factors that affect the nonlinearity of sorption isotherms, the impact of aggregation of soil and sorption materials on isotherm shape for a typical stormwater source contaminated with ammonia nitrogen was investigated using a column test.

The following is a list of the reference numbers used in the drawings and the detailed specification to identify components:

| | |
|---|---|
| 100 | column test system |
| 110 | influent reservoir |
| 120 | controller |
| 130 | pump |
| 135 | inlet lines |
| 140 | power source |
| 152 | column 1 |
| 154 | column 2 |
| 156 | column 3 |
| 158 | column 4 |
| 160 | effluent drainage |
| 165 | outlet line |

Figure 6:
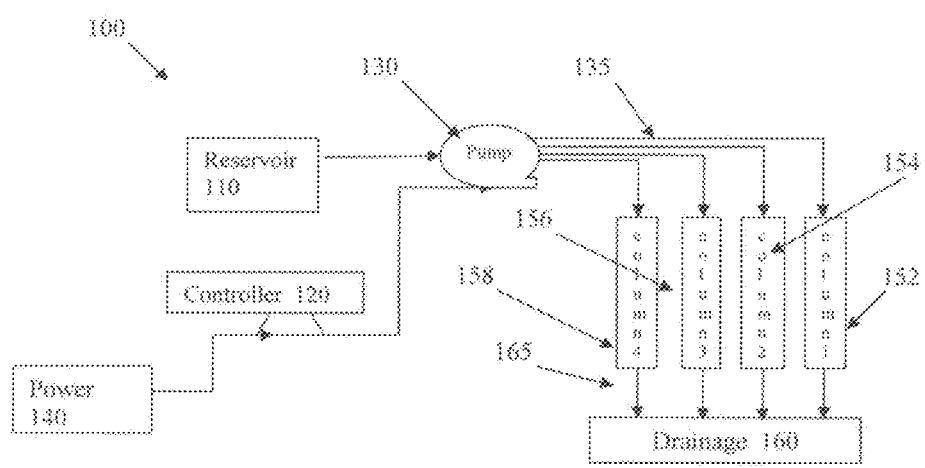
FIG. 6 is a schematic diagram of the four column setup and system used for previous experimentation.

As described in co-pending U.S. patent application Ser. No. 12/200,140 filed on Aug. 28, 2008, having a common inventor and assigned to the same assignee, which is incorporated herein by reference, the four column test system 100 shown in FIG. 6 was assembled in laboratory at University of Central Florida, Orlando for conducting the controlled experiment. Plexiglas columns 152, 154, 156 and 158 were purchased commercially from outside vendor with a diameter of 5 cm (2 inch) and length of 30 cm (1 foot). The joints of the columns are leak proof by using pipe threat sealant. Although the top and bottom of the column were closed, a removable screw cap system was used for adding media from the top of each column and removing the media from the bottom of the column. A filter with glass beads with a diameter of approximately 4 mm was placed at the bottom of each column to prevent the outward flow of finer particles from the column during the collection of samples.

Although each column is approximately 30 cm long, the media filled up to approximately 22.5 cm (9 inch) from the bottom. Tygon (Saint-Gobain, no. 16) tubes were added both top and bottom of each column for the flow of influent with inlet lines 135 to the column and effluent output lines 165 from the bottom of each column. Influent is flowed into the column from an influent reservoir 110 by using a peristaltic pump 130 such as Master flex US, Cole-Parmer instrument. A power source 140 supplies electrical power to the pump 130 and a controller 120 allows a user to control the test system. The effluent drained from the bottom of the column is collected in a drainage reservoir 160.

The four common sorption media for the column tests were selected by the co-inventors based on a unique evaluation and testing process developed by the co-inventors. The two media mixes selected for use in the column tests are denoted as stormwater media mix 1 which consists of approximately 50% fine sand, approximately 30% tire crumb, and approximately 20% sawdust, and stormwater media mix 2 which is composed of approximately 50% fine sand, approximately 25% sawdust, approximately 15% tire crumb, and approximately 10% limestone.

Recent tests also used columns that were designed to simulate field environments with saturated conditions. By using three columns, it was possible to test the performance of two mixes as compared with a control column. The control column is filled with natural soil from the Hunters Trace Pond in Ocala, Fla. The soil was sun dried and sieved with a #10 sieve to remove vegetation, rocks, and large particles. The selected two media recipes are Media Mix 1 consisting of 50% fine sand, 30% tire crumb, 20% sawdust by weight and Media Mix 2 consisting of 50% fine sand, 25% sawdust, 15% tire crumb, 10% limestone by weight based on a multicriteria decision making (MCDM) analysis. The clear Plexiglas columns have an inside diameter of 14.7 cm (5.8 inches) and are 91.4 cm (3.0 feet) in length. The bottom of each column contains a filter with three inches of fish tank rocks to prevent the media and soil mixes from exiting the columns and clogging the tubes.

Figure 7:
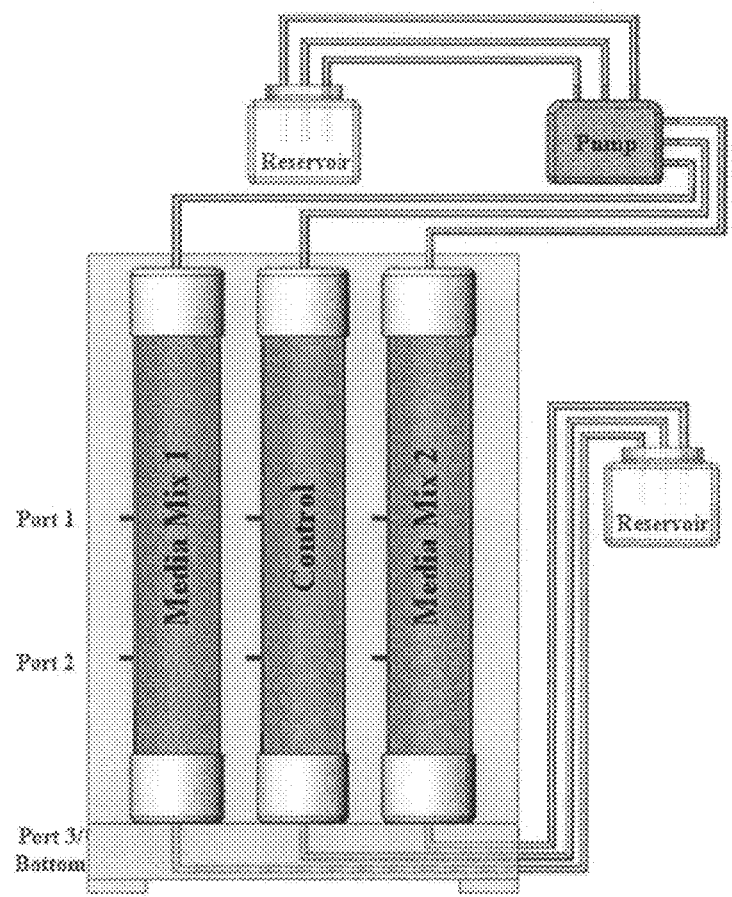
FIG. 7 is a schematic diagram of a three column setup and system used for recent experimentation.

Two ports were installed in each column to take core samples at different heights and hydraulic retention times (HRT). In addition to the ports, the water was sampled from the bottom of each column. The gaps surrounding the ports were sealed with Rectorsell 5 and Plumbing Amazing Goop. One peristaltic pump with peristaltic tubing was used to pump water from three, five gallon reservoirs into each of the columns. A fourth reservoir was used to maintain saturated conditions by connecting the column outlet tubing at a height equal to the desired water level inside the columns. FIG. 7 shows the schematic of the column setup for the tests.

The hydraulic retention time for the columns was calculated by applying the following equations into a MathCAD file so that any changes in parameters could be quickly adjusted. The contributing parameters include porosity (n), column inside diameter ($d_{column}$), and the height above sampling port (h). First, the volume ($V_{media(h)}$) was calculated using the following equation.

$$V_{media}(h) := \left[ \frac{\pi \cdot (d_{column})^2 \cdot h}{4} \right] \cdot n \qquad (4)$$

Then using the calculated volume and the desired hydraulic retention time at the bottom of the column, the flow rate (Q) for the pump was calculated.

$$Q := \frac{V_{media3}}{\theta_3} = \frac{mL}{min} \qquad (5)$$

Lastly, by using this flow rate the HRT for each port (θ) can be calculated.

$$\theta_l := \frac{V_{media1}}{Q} = min \qquad (6)$$

The columns were placed in a room capable of setting a constant temperature for two of the temperatures and a refrigerator for the lowest temperature. This design allows for the testing of the media mixes at various constant temperatures to determine the temperature impacts on filtration kinetics.

The pond water was first augmented with $KNO_3$ and $HK_2PO_4$ to pre-selected ranges and then pumped from each of the reservoirs through the columns. The concentration ranges were employed to validate the kinetics. Water samples were taken from three locations of each column, port 1, port 2 and port 3 at the bottom of each column, respectively. These samples were then tested for variations of nitrogen and phosphorus. A summary of these methods is listed Table 2.

When the rate of the equation is unknown, as in this experiment, other methods for determining the rate constant can be employed. This type of analysis is often referred to as determining the rate constant from the integrated rate law. The integrated rate law involves integrating the rate law and arranging the equation in terms of the linear equation of a line (Equations 7-9). The definitions of the variables are [C] is the final concentration of the reactant, [C$_0$] is the initial concentration of the reactant, k is the rate constant, and t stands for time.

TABLE 2

| Parameter | Method | Range* |
|---|---|---|
| pH | Fisher Scientific Accumet Portable AP61 pH meter | pH units |
| Dissolved Oxygen | YSI Model 58 DO Meter | |
| Nitrates + Nitrites | Hach Method 8192 | 0.01-0.5 mg/L NO$_3^-$N |
| Nitrites | Hach Method 8507 | 0.002-0.30 mg/L MO$_2^-$N |
| Ammonia | Hach Method 8155 | 0.001-0.50 mg/L NH$_3^-$N |
| Total Nitrogen | Hach Method 10071 | 0.5-25.0 mg/L N |
| Reactive/Othophosphate | Hach Method 8048 | 0.02-2.50 mg/L PO$_4^{3-}$ |

*Note: In some cases samples were diluted with DI water to fall within this range.

$$\text{Zero Order: } [C] = -kt \quad (7)$$

$$1^{st} \text{ Order: } \ln [C] = -kt + \ln [C_0] \quad (8)$$

$$2^{nd} \text{ Order: } 1/[C] = kt + 1/[C_0] \quad (9)$$

This analysis was applied to the columns in an attempt to describe the removal in terms of zero, first or second order kinetics. The concentrations, inverse concentrations, and natural log of concentrations are plotted versus the retention time to show the removals as low order kinetic functions. A linear regression was performed to each condition and the mean squared error was calculated to justify the best fit.

Temperature correction factor model was applied to biological processes that have small temperature variations. The variables in the Temperature correction factor model are defined as rate constant at temperature T (k$_T$), the rate constant at 20° C. (k$_{20}$), the temperature correction factor (θ), and temperature in ° C. (T). A temperature range of approximately 10° C. to 30° C. was used as the reference temperature. Three different temperatures (i.e., 28° C., 23° C., and 10° C.) were considered for temperature effects.

$$K_T = k_{20} \theta^{(T-T_{10})} \quad (10)$$

A comparison of the nitrate removal for the columns at a specific temperature was constructed utilizing an average of the removals at the bottom of the columns for all doses. Table 2 shows the nitrate removal comparison between temperature and column. From this table it is easy to distinguish how the media mixtures reacted to the change in temperature in terms of nitrate removal. All of the columns achieve their highest removal at 28° C. The nitrate performance increased with temperature. Stormwater media mix 1 and 2 had similar increases; with approximately 10% increase from 10° C. to 23° C. and then a 15% increase from 23° C. to 28° C. The control column experienced a 12% increase for the first temperature gap and 25% increase between the higher temperatures. Stormwater media mix 1 has the best removals of all three columns for 23° C., 25° C. and 28° C. with 69.7%, 79.7%, and 95.3% respectively. Stormwater media mix 1 has the highest nitrate removal for all of the experiments with 95.3% nitrate removal. Overall, stormwater media mix 2 was the best on average.

TABLE 3

| NO$_3^-$-N | Temp. 1 10° C. | Temp. 2 23° C. | Temp. 3 28° C. |
|---|---|---|---|
| Control Case | 8.0% | 20.9% | 45.8% |
| Media Mix 1 | 69.7% | 79.7% | 95.3% |
| Media Mix 2 | 63.2% | 77.9% | 93.6% |

In order to determine the effect of temperature, dose, and media mixture have on the removal efficiency which is statistically valid, the two-way ANOVA analysis was conducted for each dose and nutrient. The removal efficiencies from the bottom of each column were used to standardize the data for comparison. From the ANOVA analysis, the change from low to high concentrations seemed to have an effect on the nitrate and orhtophosphorus removals. In terms of nitrate, the ANOVA for low concentration and high concentration had the same results in terms of columns, but there were differences between the low and high concentrations in terms of temperature.

The best media mixes to select were complicated by the unexpected nutrient addition by some of the media. After taking all aspects into account, the best media for both nitrate and orthophosphate removal was stormwater media mix 2 in this study. Stormwater media mix 2 included approximately 50% sand, 25% sawdust, 15% tire crumb and 10% limestone by weight. Yet the best column for nitrate removal for all temperatures is stormwater media mix 1 which included approximately 50% sand, 20% sawdust, 30% tire crumb by weight. Selection of the best media in terms of orthophosphate was less straightforward. The control column had the best average removals at 10° C. and 23° C. However, in terms of the media performance, stormwater media mix 1 outperforms stormwater media mix 2 for two of the temperatures, although stormwater media mix 2 does have the highest individual occurrence of orthophosphate removal of all the mixes for all of the temperatures.

Soil columns are simplified models of the actual environment that allow identification and quantification of cause-and-effect relations under carefully controlled conditions, they are not conducive to testing under the full range of variations present in the natural environment. Therefore, results from the soil column experiments are verified with full-scale, field-based investigations. Two stormwater infiltration basins, including Hunter's Trace pond, are selected in different environmental settings, considering land-use type and water-table depth. Possible land-use types of interest include auto-urban/commercial and low/medium density residential. Water-table depth (i.e. thickness of the unsaturated zone) is also an important factor. Possible water-table settings of interest include a shallow (e.g. seasonal high water table less than 5 ft below basin bottom) and a deep (e.g. seasonal high water table greater than 15 ft below basin bottom) setting.

Research and experiments leading to an embodiment of the present invention evaluates the performance of a chamber upflow filter and skimmer in terms of water quality, water quantity, and overall operation and maintenance. Specifically, the objectives of the study included: (1) an estimate the head loss through an upflow filter with a chosen media mix; (2) the test the applicability of a surface skimmer; and (3) assess nitrogen and phosphorus concentrations leaving a detention pond using a chamber upflow filter and skimmer setup with a specific sorption media for pollution control.

The wet detention pond used for this research is located in the Lake Jesup Watershed in Central Florida and discharges to Howell Creek that flows into Lake Jesup. The Lake Jesup Watershed covers more than 35,222 ha (87,000 acres), and the lake itself has a surface area of 4,316 ha (10,660 acres). Lake Jesup has been identified as one of the most hypereutrophic lakes in Central Florida, as displayed often by fish kills and pea-green-colored water.

The setup of the chamber upflow filter and skimmer consists of a floating pond skimmer connected by a pipe to the bottom of a precast concrete chamber. The chamber, a Department of Transportation inlet, houses the filtering media which serves as the main nutrient removal mechanism in the experiment. The floating pond skimmer is the inlet that directs water from the surface of the pond through the filter. The inlet at the water surface allows heavier particles to settle in the pond, and the water has fewer particles that will travel to the filter. The skimmer helps provide the power required to push the pond water through the filtering media and out to the pond effluent. This happens as a result of the difference in water elevations between the pond and upflow filter. The actual water surface elevation in the filter is lower than that of the pond due to the head loss of the filtering media. At a time when no inflow to the pond is encountered (i.e., no stormwater runoff), the water level in the stormwater pond equals the head difference of the upflow filter and pollution control media so that the filter media cannot treat any water.

Figure 8:
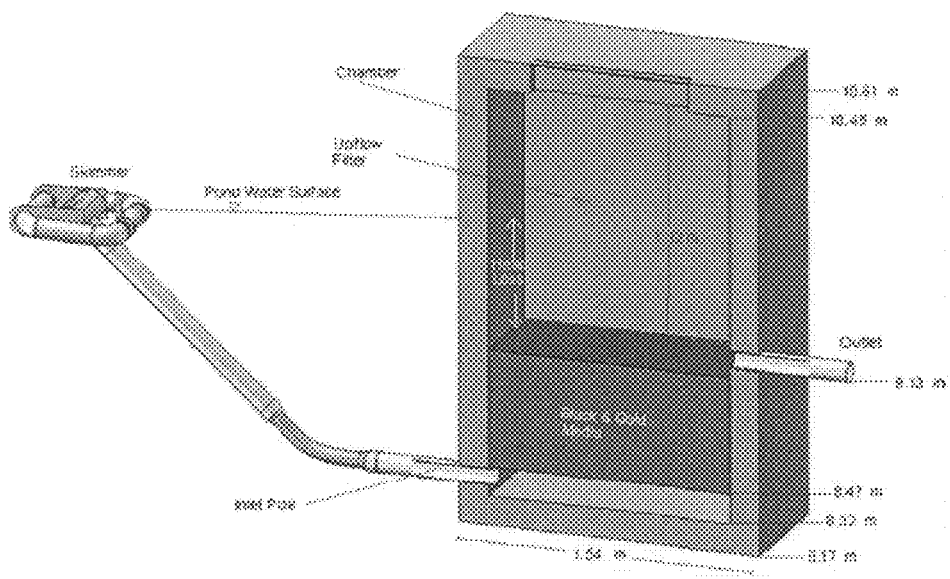
FIG. 8 is a schematic diagram showing the chamber upflow filter and skimmer with example water levels.

When stormwater water enters the pond during and after a storm event, the pond water surface elevation rises, along with the floating skimmer. The rise in the skimmer provides a difference in water surface elevation between the pond and the surface of the upflow filter. The elevation head differential supplies the power required to push the pond water through the upflow filter and out to the pond effluent pipe as shown in FIG. 8.

Because water flows through the filtering media causing head loss, a bench study was performed over target surface loading rates to conclude the head loss of the chosen pollution control media. For flow conditions, ordinary filtration velocities are considered for the design of the filter. To confirm the head loss and functionality of the chamber upflow filter and skimmer, a pilot-scale design was built on a smaller detention pond than the target pond in Seminole County. As a pilot test, the Arboretum chamber structure on campus at the University of Central Florida was installed adjacent to the rectangular weir outflow.

Figure 9A:
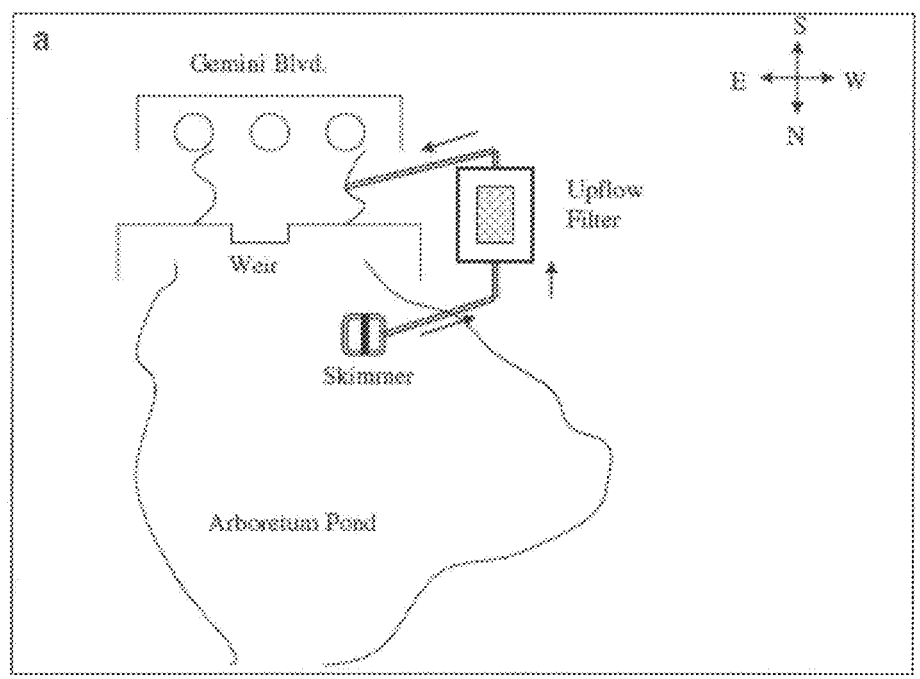
FIG. 9a is a plan view showing the chamber upflow filter and skimmer at the University of Central Florida pond.
Figure 9B:
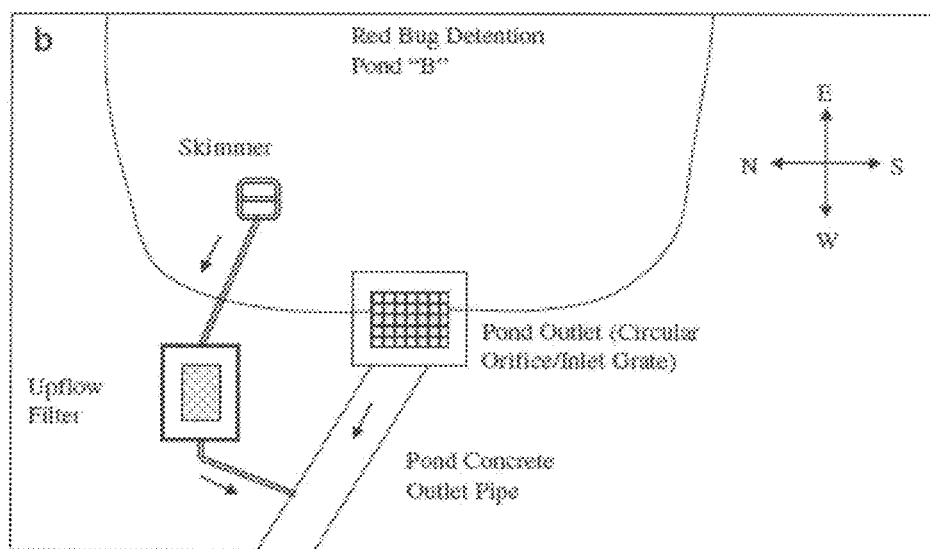
FIG. 9b is a plan view showing the chamber upflow filter and skimmer at Red Bug Pond.

FIG. 9a shows a plan view of the Arboretum pond at the University of Central Florida and FIG. 9b shows a plan view of the Red Bug pond in Seminole County Florida. The skimmer connects to the piping into the bottom of the chamber, and the filter effluent flows into the pond effluent downstream of the weir, as shown in FIG. 9a. This configuration allows the chamber upflow filter and skimmer to function in parallel with the pond effluent structure to directly compare the water quantity and quality data for storm events. The pilot study confirmed the head loss obtained at the laboratory-scale testing for the chamber upflow filter and skimmer.

The full-scale chamber upflow filter and skimmer is installed in parallel with the detention pond outlet at the Red Bug Pond in Seminole County, as shown in FIG. 9b. Stormwater from the detention pond flows down the inlet pipe, up through the filtering media, and out the filter outlet pipe. The outlet from the filter connects to the concrete outlet pipe of the pond, and the filtered water and effluent pond water mix and travel to Howell Creek. The first field application of the chamber upflow filter and skimmer occurred on site at Red Bug stormwater pond.

At the maximum possible flow from the skimmer, the pollution control media treats the stormwater at a surface loading rate within the target range. The outflow pipe in the upflow filter must also be large enough to handle the inflow. The filter outflow pipe is sized using the orifice equation:

$$Q = C_d A \sqrt{2gH} \tag{11}$$

where $Q$ is the flow in cubic meters per second, $C_d$ is the coefficient of discharge, A is the area of orifice in square meters, g is the acceleration from gravity (9.811n/s2), and H is the head acting on the top of the chamber upflow filter and skimmer in meters. The result of this equation yields the minimum size outflow pipe required to achieve the target flow.

The upflow filter uses several types of green sorption media to improve water quality in stormwater runoff. This mix consisted of approximately 45% expanded clay, approximately 45% recycled tire crumb, and approximately 10% saw dust. The mix is poorly graded with an uneven curve over the range of consideration. The water permeability is good for operation though. The following table shows the sizing specifics of the chamber upflow filter and skimmer.

TABLE 4

| Items | Attributes | Attribute Values |
|---|---|---|
| Design Criteria | Media Mix | 61.08 cm (2 ft) |
| | Head loss | 22.86 cm (9 in) |
| | Target Velocity Range | 140.23-353.21 m³/day/m² (2-5 gpm/ft²) |
| UCF Arboretum | DOT type C inlet | 0.61 × 0.91 m (2 × 3 ft) surface area |
| | Skimmer diameter | 5.08 cm (2 in.) |
| | Max inflow from skimmer | 92.96 m³/day (3,283 ft³/day) |
| | Outflow pipe diameter | 5.08 cm (2 in.) |
| Full-scale CUFS | DOT type C inlet | 1.22 × 0.91 m (4 × 3 ft) surface area |
| | Skimmer diameter | 10.16 cm (4 in.) |
| | Max inflow from skimmer | 515.73 m³/day (18,267 ft³/day) |
| | Outflow pipe diameter | 10.16 cm (4 in.) |

The adsorption, absorption, ion exchange, and precipitation processes are intertwined with the overall physicochemical process. Some nutrients such as phosphorus, removed by inorganic media, are likely a sorption/precipitation complex. The distinction between adsorption and precipitation is the nature of the chemical bond that might form between the pollutant and sorption media. The attraction of a sorption surface between the pollutant and the sorption media causes the pollutants to leave the aqueous solution and simply adhere to the sorption media. Ammonia, nitrite, nitrate, and phosphorus may be sorbed in the chamber upflow filter and skimmer between sequential storm events.

Within the microbiological process, if organic sources are present in the stormwater runoff, hydrolysis converts particulate organic nitrogen to soluble organic nitrogen, and ammonification releases ammonia into the water. Nitrification in the detention pond occurs in the presence of oxygen in which ammonium is converted to nitrite ($NO_2^-$) and nitrite is converted to nitrate ($NO_3^-$) continuously. Because the filter media contains water on the top and bottom and is enclosed within a chamber, the media is not exposed to air, developing anoxic conditions. Denitrification occurs in the absence of free oxygen under anoxic conditions using nitrate as a final electron acceptor resulting in the stepwise reduction of $NO_3^-$ to $NO_2^-$, nitric oxide (NO), nitrous oxide ($N_2O$), and nitrogen gas ($N_2$). Denitrification also requires the presence of an electron donor, which is provided in the green sorption medium by sawdust and part of the expanded clay with bioavailable organic content. Ultimately, the amount of denitrification may be limited by the frequency and duration of the oxic/anoxic fluctuations within the filter with respect to the reaction rates during the intermittent storm events.

The experiment was performed in a 9-month period with water quality samples taken after storm events that contribute at least 0.51 cm (0.2 in.) of rainfall. During times of no rainfall, baseflows from the detention pond were sampled. A sample was considered baseflow if no stormwater entered the pond within the past 6 days. In order to collect a range of samples for comparison, the sampling times following a rainfall event varied in the study, with no more than one sample taken per day. All storm samples were collected within 24 hours of a rainfall event.

For sampling, this experiment compares the detention pond outflow to the chamber upflow filter and skimmer outflow. Since the chamber upflow filter and skimmer is installed in parallel with the detention pond, the two concentrations were directly compared. One liter of sample was taken after the water travels through the chamber upflow filter and skimmer and from the surface of the detention pond near the outlet structure, in line with the skimmer.

During the testing period, the co-inventors compared the Red Bug Pond outflow water quality to the RBF effluent water quality within a total of 35 sampling dates. These samples came from 28 storm events and seven baseflows collected over a period of 9 months. The storm samples were taken at different time intervals following the event.

pH and Alkalinity. The pollution control media in the chamber upflow filter and skimmer at both locations did not alter the pH. The alkalinity increased slightly in the chamber upflow filter and skimmer at the Red Bug Pond site and more substantially at the pilot-study site. However, the increases at both locations were not enough to conclude that the mean values are not equal based on the statistical analysis using a 95% confidence level. This is acceptable because denitrification recycles the alkalinity needed for nitrification.

Turbidity. The turbidity ranges from 8.19 to 1.94 nephelometric turbidity units (NTU) for the Red Bug Pond and 4.54 to 1.38 nephelometric turbidity units for the chamber upflow filter and skimmer based over 32 observations. The Red Bug Pond samples show that the chamber upflow filter and skimmer reduces the mean detention pond turbidity value between 0.8 and 1.7 nephelometric turbidity units.

Solids. Thirty-one observations were used to compare the total suspended solids (TSS) and total dissolved solids (TDS) concentrations for the Red Bug site. The chamber upflow filter and skimmer at the Red Bug Pond reduced the total suspended solids concentration almost in half.

Phosphorus. The orthophosphorus and total phosphorus concentrations are measured using 37 observations at the Red Bug site. For the majority of the sampling dates, total phosphorus consists of mostly orthophosphorus and very little organic phosphorus.

Nitrogen. The nitrogen forms compared in the chamber upflow filter and skimmer experiment include nitrate+nitrite ($NO_x$) and total nitrogen. To ensure that denitrification could occur, dissolved oxygen measurements were taken periodically throughout the experiment. The low dissolved oxygen measurements show that anoxic conditions occur within the filtering media of the chamber upflow filter and skimmer, allowing denitrifying bacteria to utilize nitrate and remove it from the water. As with orthophosphorus, the Red Bug Pond discharges very low concentrations of nitrite+nitrate. The data concludes that the study chamber upflow filter and skimmer reduced the mean total nitrogen concentration from the pond when compared at a 5% significance level.

The phosphorus concentrations leaving the Red Bug Pond were lower than average for wet detention facilities in Florida. Test results showed a total nitrogen removal efficiency of 35% in the Red Bug Pond. However, more phosphorus removal occurs in the Red Bug Pond than in an average wet detention pond. The measured total phosphorus value is 0.05 mg/L for the Red Bug Pond, compared to the expected value of 0.10 mg/L. This shows a total phosphorus removal of 83% assuming the influent concentration is 0.31 mg/L. The high phosphorus removal may be due to the sediment and solids removed by sedimentation in the pond. The basin that includes Red Bug Pond consists of Tavares-Millhopper, Myakka, and Eaugallie fine sands. Further testing shows a good removal of dissolved phosphorus by the sediment in the bottom of the pond. The pond also contains a littoral zone in which different types of aquatic grasses and plants inhabit. These plants utilize the dissolved phosphorus, removing it from the water. Under the normal storm events sampled, the chamber upflow filter and skimmer reduced the orthophosphorus concentration by 46%, total phosphorus by 25% and total nitrogen by 17% when compared to the pond effluents. The lower removals with nitrogen could be due to the low values of $NO_x$ (nitrite+nitrate) in the pond, limiting denitrification in the filter.

During operation, a surface skimmer supplies a design flow of water through the upflow filter in the chamber upflow filter and skimmer while improving water quality in the pond effluent. In ponds with high levels of algae, small plants, or other small debris, a layer of black fabric mat must be placed over the intake of the skimmer to prevent the debris from clogging the upflow filter after short periods of time without affecting the hydraulic performance of the chamber upflow filter and skimmer. The Red Bug chamber upflow filter and skimmer significantly reduced the concentrations of turbidity, orthophosphorus, total phosphorus, and total suspended solids compared to the pond effluent. The chamber upflow filter and skimmer is also capable of nutrient removals in highly polluted water, as shown in the reliability analysis.

Results of the testing were used to formulate sorption stormwater media for the treatment of stormwater runoff, rapid infiltrated groundwater and other liquid streams. The media included recycled material such as tire crumb, wood sawdust and paper and a naturally occurring material such as sand, limestone, sandy clay, expanded clay, organics used for processing geothermal water, organics used for agricultural drainage basins and filtration, and organics used for aquaculture drainage and organics used for silviculture and forest drainage, and organics used as growing media.

For stormwater treatment, the media included, namely rubber tire crumb combined with sandy clay and wood saw dust for nitrogen control in stormwater, urban runoff and other liquid streams. The sorption media included rubber tire crumb combined with expanded clay and wood saw dust for phosphorus control in stormwater, urban runoff and other liquid streams. The sorption media included rubber tire crumb combined with sand and wood saw dust for use with pervious pavements and bio filtration reservoirs. The sorption media included expanded clay and limestone for filtration and alkalinity control in stormwater, urban runoff and other liquid streams. The sorption media included expanded clay, and organics used for processing geothermal waters and included sandy clays and organics used for agricultural drainage basins and filtration. It was also found that the sorption media included expanded clay, sands, and organics used for aquaculture activities (fish and vegetation) drainage and included expanded clay, sands and organics used for silviculture and forest drainage management.

The naturally occurring material included sandy clay or expanded clay for stormwater treatment. For nitrogen control in stormwater management systems, the media composition by volume included approximately 68% to approximately 72% sandy clay, approximately 6% to approximately 8% saw dust, and approximately 20% to approximately 26% tire crumb. The media composition by volume included approximately 68% to approximately 72% expanded clay, approximately 6% to approximately 8% saw dust, and approximately 20% to approximately 26% tire crumb for phosphorus control in stormwater management systems. For filtration and alkalinity control in a stormwater management system, the media included approximately 40 to approximately 60% expanded clay and approximately 40 to approximately 60% limestone. While the media mixes are described as separate mixes for each use, those skilled in the art will understand that the media mixes can be combinations such as combining mixes for control of nitrogen and phosphorus.

The present invention includes media compositions for stormwater vaulted systems. In one embodiment, the media composition includes sand, saw dust and tire crumb as a stormwater composition for filtration in stormwater vaulted systems. In a preferred embodiment, the media composition by volume includes approximately 68 to approximately 72% sand, approximately 6 to approximately 8% saw dust, and approximately 20 to approximately 26% tire crumb as a stormwater composition for filtration in stormwater vaulted systems.

Media for use with pervious pavements and bio filtration reservoirs in a stormwater management system included approximately 74% to approximately 78% sand, approximately 6 to approximately 10% saw dust, approximately 12 to approximately 20% tire crumb and to process geothermal water discharges in a stormwater management system the media composition by volume included approximately 65 to approximately 72% sandy clay, approximately 6 to approximately 10% organics, and approximately 20 to approximately 25% tire crumb.

In another embodiment for agricultural drainage basins and filtration in a stormwater management system, the media composition by volume included approximately 65 to approximately 75% expanded clay, approximately 5 to approximately 15% organics, and approximately 10 to approximately 20% tire crumb.

For aquaculture activities (fish and vegetation) drainage in a stormwater management system, the media composition by volume included approximately 60 to approximately 70% expanded clay, approximately 5 to approximately 20% organics, and approximately 10 to approximately 20% tire crumb.

For silviculture and forest drainage management, the media composition by volume included approximately 60 to approximately 70% sandy clay, approximately 6 to approximately 10% organics, and approximately 20 to approximately 30% tire crumb for silviculture and forest drainage management in a stormwater management system.

Combined Sewer Overflow Water Treatment:

In the early 1900s, cities built sewer systems to carry rain water and sewage in the same pipe. This is called a combined sewer. During dry weather conditions, the sewer system works fine. But, during heavy rain storms, the water in the combined sewers overflow into local rivers. When it rains heavily, the sewer fills up and the water includes sewage overflows into the river. A combined sewer overflow also occurs in a combined sewer/storm water system, where both storm water and sanitary sewage flow in the same pipe. These overflows were designed to prevent flooding at the wastewater treatment plants when the volume of rain exceeds the capacity of the combined pipes.

Combined sewer overflow's pose pollution and public health risks since they are a collection of residential, commercial and industrial wastes, and other pollution washed into storm drains. CSOs carry pollutants in the form of sewage solids, metals, oil, grease and bacteria that can affect the health of people who swim in or eat shellfish from CSO polluted waters. Changing national, local and state requirements have added a sense of urgency to find new solutions to new regulations for stormwater and CSO discharges.

The present invention provides sorption media compositions for CSO wastewater and stormwater treatment. The media composition includes sand, saw dust, tire crumb and limestone as a stormwater composition for pollution control in CSO upflow treatment units. In a preferred embodiment, the media composition by volume includes approximately 46 to approximately 54% sand, approximately 12 to approximately 18% saw dust, approximately 12 to approximately 18% tire crumb, 18 to approximately 22% limestone as a stormwater composition for pollution control in CSO upflow treatment units.

Greenroof Stormwater Treatment:

Greenroof media for the growth of vegetation and retention of pollutants includes use of expanded clay, and organics used as a growing media. As an under growth media to retain pollutants for pollution control, the media composition included rubber tire crumb combined with expanded clay and wood saw dust.

Co-pending U.S. patent application Ser. No. 12/200,140 filed on Aug. 28, 2008, and having a common inventor and the same assignee as this application, which is incorporated herein by reference, focus was placed on the water quality benefits of a specifically designed green roof stormwater treatment system at the New American Home. The green roof stormwater treatment system shown in FIGS. 7a and 7b of the co-pending '140 patent application includes an irrigated green roof with a cistern to store the stormwater and uses a selected media for pollution control along with a growth media to sustain plant species on the roof. The primary water quality measures of concern are physical parameters and nutrients. The benefits of using green roof as stormwater treatment systems is confirmed in terms of the effectiveness of specific stormwater designs.

Recycling the stormwater runoff and irrigating the green roof with stored water enhances hydrologic related factors such as evapotranspiration, the filtering abilities of the plants and media, and the water holding abilities of the plants and media, as well as greatly reduce the volume of stormwater runoff leaving the site. In order to achieve this, a cistern needs to be used to store the water between irrigation events. The only two ways water leaves the system is through evapotranspiration and as stormwater runoff when the system reaches storage capacity from large storm events. The only two ways water enters the system is from precipitation and from a supplemental source, such as the cistern that is used for irrigation. The efficiency of the system is determined from the total precipitation and the total overflow. The green roof stormwater treatment system was proved effective at reducing the mass of pollutants relative to that from a conventional roof also. The experiment showed that a green roof with a cistern from which irrigation water is recycled offers an aesthetically pleasing treatment solution that utilizes unused space to treat and store stormwater runoff.

The present invention provides a media composition that includes by volume approximately 70% to approximately 80% expanded clay combined with approximately 20% to approximately 30% compost as a greenroof growth media in a greenroof system. In another embodiment, a greenroof retention media mix includes approximately 62% to approximately 66% expanded clay, approximately 8% to approximately 10% saw dust and approximately 24% to approximately 30% tire crumb by volume to retain pollutants in a greenroof water management system.

While the greenroof media mixes are described as separate mixes for use as a greenroof growth media and greenroof retention media mix, those skilled in the art will understand that the media mixes can be used in combinations such as using the greenroof retention media mix under a greenroof growth media.

While the invention has been described, disclosed, illustrated and shown in various terms of certain embodiments or modifications which it has presumed in practice, the scope of the invention is not intended to be, nor should it be deemed to be, limited thereby and such other modifications or embodiments as can be suggested by the teachings herein are particularly reserved especially as they fall within the breadth and scope of the claims here appended.

We claim:

1. A sorption media composition consisting of:
    at least two of a recycled material and a naturally occurring material,
    the recycled material selected from a group consisting of tire crumb, wood sawdust and compost, and
    the naturally occurring material selected from a group consisting of sand, limestone, sandy clay, expanded clay, and peat.

2. The sorption media composition of claim 1 wherein the recycled material consists of wood saw dust and tire crumb and the naturally occurring material is selected from a group including sand, saw dust, expanded clay, peat and limestone for wastewater treatment.

3. The media of claim 2 wherein the media composition by volume consists of:
    approximately 66% to approximately 72% sand;
    approximately 6% to approximately 8% saw dust; and
    approximately 20% to approximately 28% tire crumb as a septic composition for nitrogen control in an on-site wastewater treatment.

4. The media of claim 2 wherein the media composition by volume consists of:
    approximately 77% to approximately 82% sand and approximately 18% to approximately 23% limestone as a septic composition for alkalinity control in on site wastewater treatment.

5. The media of claim 2 wherein the media composition consists of:
    sand, saw dust, tire crumb and limestone as a septic composition for subsurface upflow wetland.

6. The media of claim 5 wherein the media composition by volume consists of:
    approximately 46 to approximately 54% sand;
    approximately 12 to approximately 18% saw dust;
    approximately 12 to approximately 18% tire crumb; and
    approximately 18 to approximately 22% limestone as a septic composition for pollution control in subsurface upflow wetlands.

7. The media of claim 5 wherein the media composition consists of:
    expanded clay and peat as a septic composition for promoting plant growth in a subsurface upflow wetland.

8. The media of claim 7 wherein the media composition by volume consists of:
    approximately 75% to approximately 80% expanded clay; and
    approximately 20 to approximately 25% peat as a septic composition for promoting plant growth in a subsurface upflow wetland.

9. The media of claim 5 wherein the media composition by volume includes:
    approximately 46 to 54% sand as a septic composition for pollution control in subsurface upflow wetlands.

10. The media of claim 9 wherein the media composition by volume further includes:
    approximately 12 to 18% tire crumb as a septic composition for pollution control in subsurface upflow wetlands.

11. The media of claim 10 wherein the media composition by volume further includes:
    approximately 18 to 22% limestone as a septic composition for pollution control in subsurface upflow wetlands.

12. The media of claim 2 wherein the media composition consists of:
    at least two of sand, expanded clay, peat, saw dust, tire crumb and limestone as a stormwater composition for pollution control in CSO upflow treatment units.

13. The media of claim 12 wherein the media composition by volume consists of:
    approximately 46 to approximately 54% sand, approximately 12 to approximately 18% saw dust, approximately 12 to approximately 18% tire crumb, 18 to approximately 22% limestone as a stormwater composition for pollution control in CSO upflow treatment units.

14. The media of claim 12 wherein the media composition by volume consists of:
    approximately 75 to approximately 80% expanded clay and approximately 20 to approximately 25% peat for plant growth in CSO upflow treatment units.

15. The media of claim 2 wherein the media composition by volume consists of:
    approximately 66% to 72% sand.

16. The media of claim 15 wherein the media composition by volume consists of:
    approximately 20% to 28% tire crumb as a septic composition for nitrogen control in an on-site wastewater treatment.

17. The media of claim 1 wherein the recycled material is selected from a group consisting of wood saw dust, compost and tire crumb and the naturally occurring material is selected from a group consisting of sand, sandy clay, expanded clay, peat and limestone for stormwater treatment.

18. The media of claim 17 wherein the media composition by volume consists of:
    approximately 68% to approximately 72% sandy clay, approximately 6% to approximately 8% saw dust, and approximately 20% to approximately 26% tire crumb for nitrogen control in stormwater management systems.

19. The media of claim 18 wherein the media composition by volume consists of:
    approximately 72% to approximately 78% expanded clay, approximately 8% to approximately 12% saw dust, and approximately 10% to approximately 18% tire crumb for phosphorus control in stormwater management systems.

20. The media of claim 17 wherein the media composition by volume consists of:
   approximately 74% to approximately 78% sand, approximately 6% to approximately 10% saw dust, approximately 12% to approximately 20% tire crumb for use with pervious pavements and bio filtration reservoirs in a stormwater management system.

21. The media of claim 17 wherein the media composition by volume consists of:
   approximately 40% to approximately 60% expanded clay and approximately 40% to approximately 60% limestone for filtration and alkalinity control in a stormwater management system.

22. The media of claim 17 wherein the media composition by volume consists of:
   approximately 70% to approximately 80% expanded clay combined with approximately 20% to approximately 30% compost as a greenroof growth media in a greenroof system.

23. The media of claim 22 wherein the media composition to retain pollutants in a greenroof water management system is used under a greenroof growth media to retain pollutants in a greenroof water management system.

24. The media of claim 17 wherein the media composition by volume consists of:
   approximately 62% to approximately 66% expanded clay, approximately 8% to approximately 10% saw dust and approximately 24% to approximately 30% tire crumb to retain pollutants in a greenroof water management system.

25. The media of claim 17 wherein the media composition by volume consists of:
   approximately 72% to approximately 782% sand, approximately 8% to approximately 12% saw dust, and approximately 10% to approximately 18% tire crumb for filtration in stormwater vaulted systems for stormwater management.

26. The media of claim 17 wherein the media composition by volume consists of:
   approximately 55% to approximately 65% expanded clay, approximately 18% to approximately 22% sandy clay and approximately 10 to approximately 30% tire crumb for nutrient control in a stormwater upflow chamber for stormwater management.

27. The media of claim 17 wherein the media composition by volume consists of:
   approximately 65 to approximately 72% sandy clay, approximately 6 to approximately 10% organics, and approximately 20 to approximately 25% tire crumb as a geothermal composition to process geothermal water discharges in a stormwater management system.

28. The media of claim 17 wherein the media composition by volume consists of:
   approximately 65 to approximately 75% expanded clay, approximately 5 to approximately 15% organics and approximately 10 to approximately 20% tire crumb as an agricultural composition for agricultural drainage basins and filtration in a stormwater management system.

29. The media of claim 17 wherein the media composition by volume consists of:
   approximately 60 to approximately 70% expanded clay, approximately 5 to approximately 20% organics and approximately 10 to approximately 20% tire crumb as an aquaculture composition for aquaculture activities and drainage in a stormwater management system.

30. The media of claim 17 wherein the media composition by volume consists of:
   approximately 60 to approximately 70% sandy clay, approximately 6 to approximately 10% organics, and approximately 20 to approximately 30% tire crumb as a silviculture composition for silviculture and forest drainage management in a stormwater management system.

31. The media of claim 17 wherein the media composition by volume includes:
   approximately 68% to 72% sandy clay and approximately 20% to 26% tire crumb for nitrogen control in stormwater management systems.

32. The media of claim 17 wherein the media composition by volume includes:
   approximately 62% to 66% expanded clay and approximately 24% to 30% tire crumb to retain pollutants in a greenroof water management system.

33. The media of claim 17 wherein the media composition by volume includes:
   approximately 72% to 78% sand and approximately 10% to approximately 18% tire crumb for filtration in stormwater vaulted systems for stormwater management.

\* \* \* \* \*